United States Patent [19]
Tajima

[11] Patent Number: 5,909,184
[45] Date of Patent: Jun. 1, 1999

[54] FM TELETEXT RECEIVING DEVICE WITH A DETACHABLE STORAGE MEDIUM

[75] Inventor: Yoichiro Tajima, Kunitachi, Japan

[73] Assignee: Casio Computer Co., Ltd., Tokyo, Japan

[21] Appl. No.: 08/561,498

[22] Filed: Nov. 20, 1995

[30] Foreign Application Priority Data

| Nov. 22, 1994 | [JP] | Japan | 6-312760 |
| Dec. 9, 1994 | [JP] | Japan | 6-331832 |
| Dec. 20, 1994 | [JP] | Japan | 6-334906 |
| Mar. 21, 1995 | [JP] | Japan | 7-088785 |
| May 17, 1995 | [JP] | Japan | 7-142517 |

[51] Int. Cl.⁶ .......................... H04Q 19/02; G09G 5/00
[52] U.S. Cl. ................ 340/825.27; 345/2; 379/357; 455/186.1; 705/418
[58] Field of Search .............. 340/825.27, 825.29, 340/825.3, 825.36, 825.37, 825.31, 825.44; 379/357, 58; 455/186.1, 575; 345/2; 235/377; 705/41, 418; 707/10

[56] References Cited

U.S. PATENT DOCUMENTS

| 4,484,217 | 11/1984 | Block et al. | 348/3 |
| 4,845,491 | 7/1989 | Fascenda et al. | 340/825.44 |
| 5,045,848 | 9/1991 | Fascenda | 340/825.26 |
| 5,049,874 | 9/1991 | Ishida et al. | 340/825.44 |
| 5,282,249 | 1/1994 | Cohen et al. | 340/825.31 X |
| 5,371,493 | 12/1994 | Sharpe et al. | 340/825.34 |
| 5,398,021 | 3/1995 | Moore | 340/825.27 |
| 5,426,422 | 6/1995 | Vanden Heuvel et al. | 340/825.27 |
| 5,504,475 | 4/1996 | Houdou et al. | 340/825.35 |
| 5,539,822 | 7/1996 | Lett | 380/20 |
| 5,604,787 | 2/1997 | Kotzin et al. | 379/58 |
| 5,659,980 | 8/1997 | Hidaka | 455/575 |

FOREIGN PATENT DOCUMENTS 4-134930 5/1992 Japan.

Primary Examiner—Steven J. Saras
Assistant Examiner—Seth D. Vail
Attorney, Agent, or Firm—Frishauf, Holtz, Goodman, Langer & Chick

[57] ABSTRACT

A service information receiving device receives pay service information and year/month/day-of-month data, both multiplexed with FM broadcast radiowaves and transmitted from an FM broadcasting station. The device compares the use end date data, stored in an information storage medium which is detachable from the device, with the year/month/day-of-month data received by the device, and the device permits the display of the pay service information during the period in which these two sets of data disagree with each other, and after they have coincided with each other, inhibits the display of the pay service information.

24 Claims, 19 Drawing Sheets

| STATION NO. | TRANSMISSION FREQUENCY | BROADCASTING STATION NAME |
|---|---|---|
| 1 | A MHZ | A STATION |
| 2 | B | B STATION |
| 3 | C | C STATION |
| ... | ... | ... |

| STATION NO. | TRANSMISSION FREQUENCY | BROADCASTING STATION NAME |
|---|---|---|
| 1 | X MHZ | X STATION |
| 2 | Y | Y STATION |
| 3 | Z | Z STATION |
| ... | ... | ... |

EXISTS FOR EACH AREA

FIG.8

| AREA NO. | AREA NAME |
|---|---|
| 1 | HOKKAIDO |
| 2 | AOMORI |
| 3 | IWATE |
| ... | ... |
| 47 | OKINAWA |

PROGRAM TABLE

| PROGRAM NAME | CHARGED | SAMPLE PROGRAM | EXTRA | PROGRAM NAME | CHARGED | SAMPLE PROGRAM | EXTRA |
|---|---|---|---|---|---|---|---|
| 1.PROGRAM a | | | | 5.PROGRAM e | ○ | | |
| 2.PROGRAM b | ○ | | | 6.PROGRAM f | ○ | ○ | ×3 |
| 3.PROGRAM c | ○ | ○ | ×2 | 7.PROGRAM g | ○ | | |
| 4.PROGRAM d | ○ | ○ | | 8.PROGRAM h | ○ | | |

PROGRAM TABLE

| PROGRAM NAME | CHARGED | SAMPLE PROGRAM | EXTRA |
|---|---|---|---|
| 1.PROGRAM a | ○ | | |
| 2.PROGRAM b | ○ | | ×2 |
| 3.PROGRAM c | ○ | ○ | |
| 4.PROGRAM d | | ○ | |

USE END YEAR/MONTH/DAY-OF-MONTH 1996.12.31

| PROGRAM NAME | CHARGED | SAMPLE PROGRAM | EXTRA |
|---|---|---|---|
| 5.PROGRAM e | ○ | | |
| 6.PROGRAM f | ○ | | |
| 7.PROGRAM g | ○ | | ×3 |
| 8.PROGRAM h | ○ | ○ | |

PAY PROGRAM RECEPTION SETTING

NO. OF SETTABLE PROGRAMS 0

| PROGRAM NAME | CHARGED | EXTRA |
|---|---|---|
| 1. PROGRAM a | | |
| 2. PROGRAM b | ○ | |
| 3. PROGRAM c | | |
| 4. PROGRAM d | ○ | ×2 |

| PROGRAM NAME | CHARGED | EXTRA |
|---|---|---|
| 5. PROGRAM e | | |
| 6. PROGRAM f | | |
| 7. PROGRAM g | | |
| 8. PROGRAM h | | ×3 |

FIG.20

FM TELETEXT RECEIVING DEVICE WITH A DETACHABLE STORAGE MEDIUM

BACKGROUND OF THE INVENTION

1. Field of the Invention

This invention relates to a receiving device that receives the pay display information transmitted from a broadcasting station and displays it. The present invention is most suitable for receivers for FM teletext multiplexed with FM broadcast radiowaves and which is then transmitted.

2. Description of the Related Art

There has been a service using the medium of FM broadcast radiowaves, where service information, such as character information, is multiplexed with FM (Frequency Modulation) broadcast radiowaves—audio information—and then transmitted, and the service information is caused to appear on a display means provided on the reception side. This service is known as FM teletext and has been coming in practice as a visual information radio.

Specifically, the FM broadcasting station on the transmission side transmits the FM broadcast radiowaves with which display information, such as characters and numbers, has been multiplexed. The radiowaves are received on the reception side with an FM radio with a liquid-crystal display, which separates the display information, such as characters and numbers, from the FM broadcast radiowaves, converts the display information into character codes, and displays the characters on the liquid-crystal display unit to enable the user to view, for example, a weather forecast or traffic information on the screen. With the FM teletext system, some of the service information is available free of charge and specific kinds of the service information may be provided with charge.

When the pay service information is provided for the users in the FM teletext system, the company operating the FM teletext must collect license fees in a suitable way. If the company tries to collect license fees according to a monthly pay contract with the users, some users are liable to fall behind in their payment, making it complex to manage the users. Furthermore, since it is expected that more than one company will run a service information providing business, each company practically cannot pinpoint the users of its service and collect license fees.

On the part of users, they have to go to the company or the financial institution to pay their licence fees, imposing a burden on them. Furthermore, in the case of FM teletext, it is practically impossible to stop the supply of service information only to the users who have fallen behind in their payments, because FM broadcast radiowaves are used.

SUMMARY OF THE INVENTION

The object of the present invention is to provide a display information receiving device, a display information transmission/reception system, and a storage medium which enables the users to pay license fees easily and the company to manage the users without complicated procedures when pay display information is transmitted.

To accomplish the foregoing object, according to one preferred aspect of the invention, there is provided a display information receiving device comprising: receiving means for receiving the display information transmitted from a display information transmitting station; display means for displaying the display information received by the receiving means; a device body which enables installation and removal of a storage medium that stores the time information indicating time; acquiring means for acquiring the present time; judging means for judging whether or not the present time acquired by the acquiring means has reached the time indicated by the time information stored in the storage medium installed in the device body; and control means for inhibiting the display of the display information transmitted from the display information transmitting station after the judging means has judged that the present time has reached the stored time. With this configuration, at the time of selling a storage medium detachable from the display information receiving device, it is possible to charge according to a time period while the pay display information can be checked visually with the display information receiving device.

Furthermore, according to another preferred aspect, there is provided a display information transmission/reception system comprising: a display information transmitting device for transmitting display information and present time information; a storage medium for storing the time information indicating time; and a display information receiving device which enables installation and removal of the storage medium that receives the display information and present time information transmitted from the display information transmitting device, wherein the display information receiving device comprises: receiving means for receiving the display information and present time information transmitted from the display information transmitting device; display means for displaying the display information received by the receiving means; judging means for judging whether or not the present time indicated by the present time information received by the receiving means has reached the time indicated by the time information stored in the storage medium; and control means for inhibiting the display of the display information transmitted from the display information transmitting device after the judging means has judged that the present time has reached the stored time. With this configuration, at the time of selling a storage medium detachable from the display information receiving device, it is possible to charge according to a time period while the pay display information transmitted from the display information transmitting device can be checked visually with the display information receiving device.

Additionally, according to still another preferred aspect, there is provided a storage medium comprising:

storage means for storing the time information indicating the time for controlling whether the display on a display information receiving device that receives the display information transmitted from a display information transmitting station is allowed or inhibited; and interface means for interfacing with the display information receiving device that enables installation and removal of the medium. With this configuration, at the time of selling a storage medium, it is possible to charge according to the period while the pay display information can be checked visually with the display information receiving device that enables installation and removal of the medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 8 shows the contents of the table stored in the ROM in the service information receiving device of the above embodiment;

FIG. 18 shows a representation on the program select screen;

FIG. 19 shows another representation on the program select screen; and

FIG. 20 shows a representation during pay program reception setting.

DETAILED DESCRIPTION OF THE PREFERRED EMBODIMENTS

Figure 1:
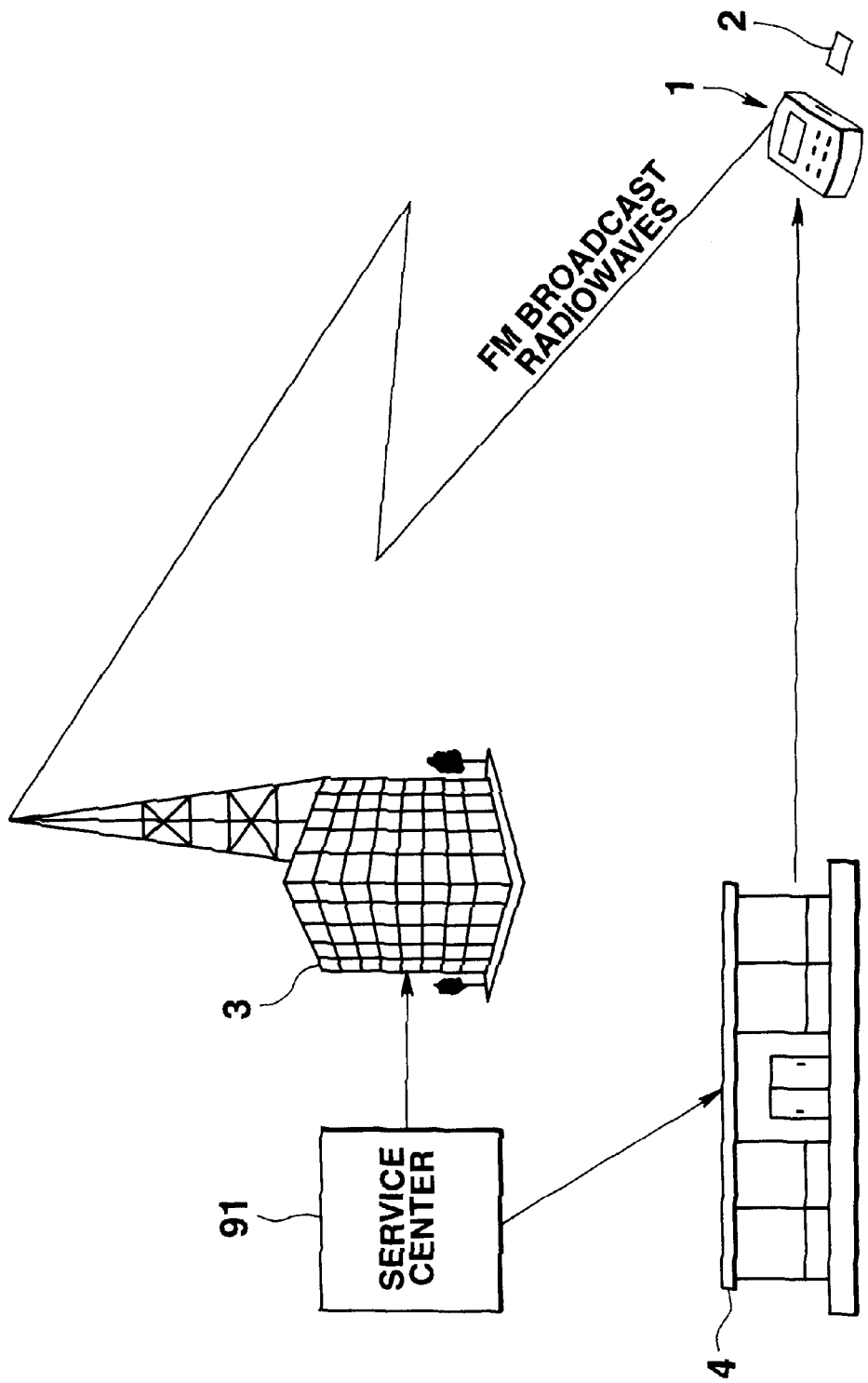
FIG. 1 is a schematic explanatory diagram of a system configuration of an FM teletext system to which an embodiment of the present invention is applied.

Hereinafter, embodiments of the present invention will be explained in detail. FIG. 1 shows the configuration of an FM teletext broadcasting system to which an embodiment of the present invention is applied.

The FM teletext broadcasting system comprises an FM broadcasting station—3, such as an enterprise that transmits FM broadcast radiowaves obtained by multiplexing pay and free pieces of service information, a service information receiving device 1 that receives the FM broadcast radiowaves transmitted from the FM broadcasting station 3, an IC (Integrated Circuit) card—2 which serves as an information storage medium used in receiving pay service information in the service information receiving device 1, and a shop 4, such as a convenience store, that sells IC cards 2. The shop 4 is under a specific card sales contract to a service center 91.

Specifically, the service center 91 is not only an issuing company of the IC cards 2, but also a producing company of pay programs—pay service information. The pay programs produced at the service center 91 are sent as pay service information to the FM broadcasting station 3, which transmits these programs together with the free service information—the free programs produced at the FM broadcasting station 3 and others. The pay service information may be delivered from the service center 91 to the FM broadcasting station 3 by wire, by radio, by magnetic tape, or in other suitable ways.

The service information receiving device 1 will be explained with reference to FIGS. 2 to 5.

Figure 2:
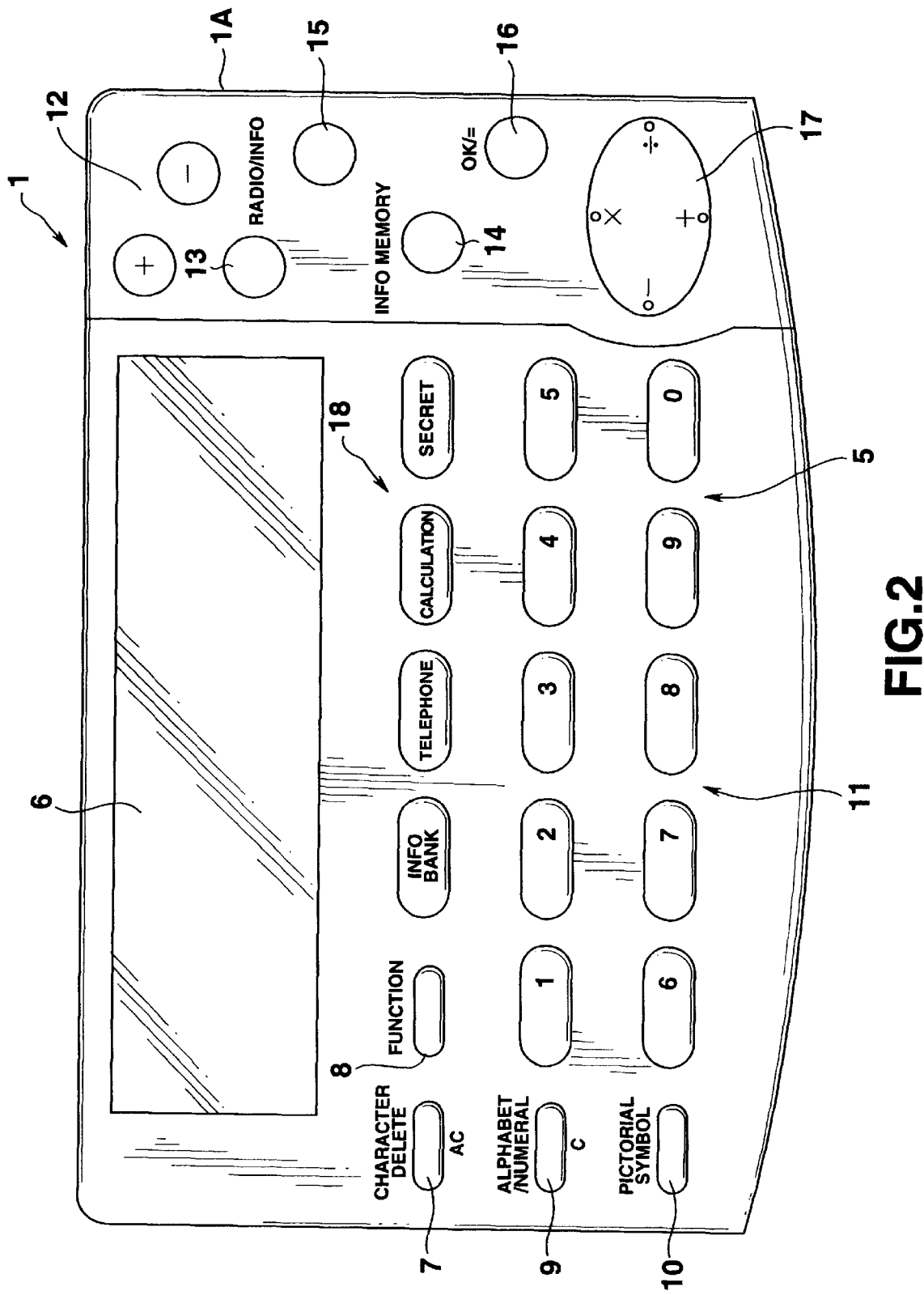
FIG. 2 is a plan view of a service information receiving device according to an embodiment of the invention.

As shown in FIG. 2, the service information receiving device 1 has a key input section 5 and a display section 6 acting as display means for displaying service information on the surface of its almost rectangular parallelepipedic device body 1A. The key input section 5 is provided with a character delete key 7, a function select key 8, an alphabet/numeral select key 9 for selecting alphabets and numerals, a pictorial symbol key 10, an alphanumeric key group 11 for entering the alphabetical letters A to Z and the numerals 1 to 0, a tuning key 12 for tuning the reception of broadcast radiowaves, a radio/info select key 13, an information memory key 14, a pay reception frequency setting key 15, an OK key 16, a cursor key 17 for performing FM multiplex program selection, cursor movement, execution, calculation, etc., and a mode key group 18 for selecting such modes as information bank, telephone, calculation, and secret.

Figure 3:
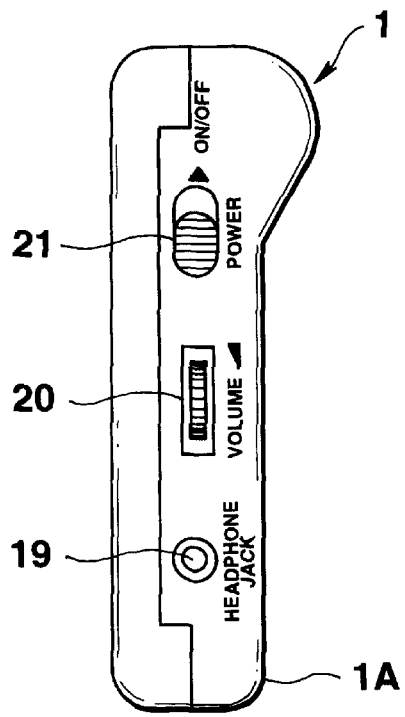
FIG. 3 is a left-side view of the service information receiving device.
Figure 4:
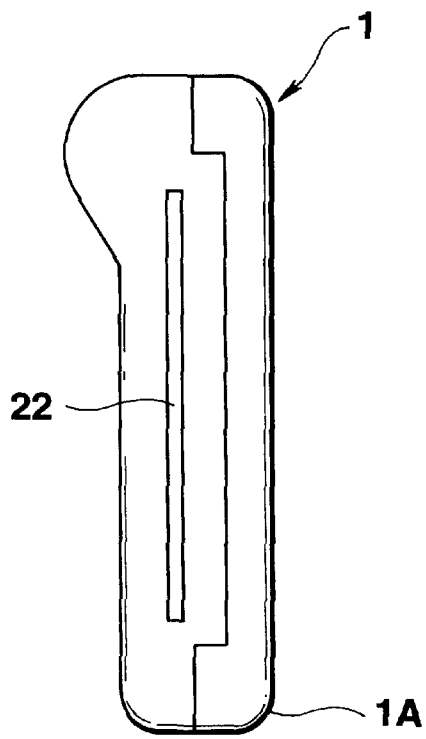
FIG. 4 is a right-side view of the service information receiving device of FIG. 2.

Provided on one side of the service information receiving device 1 are a stereo headphone jack 19, a volume control dial 20, and a power switch 21 as shown in FIG. 3. On the other side of the service information receiving device 1, there is provided a slot 22 in which the IC card 2, an information storage medium, is installed as shown in FIG. 4.

Figure 5:
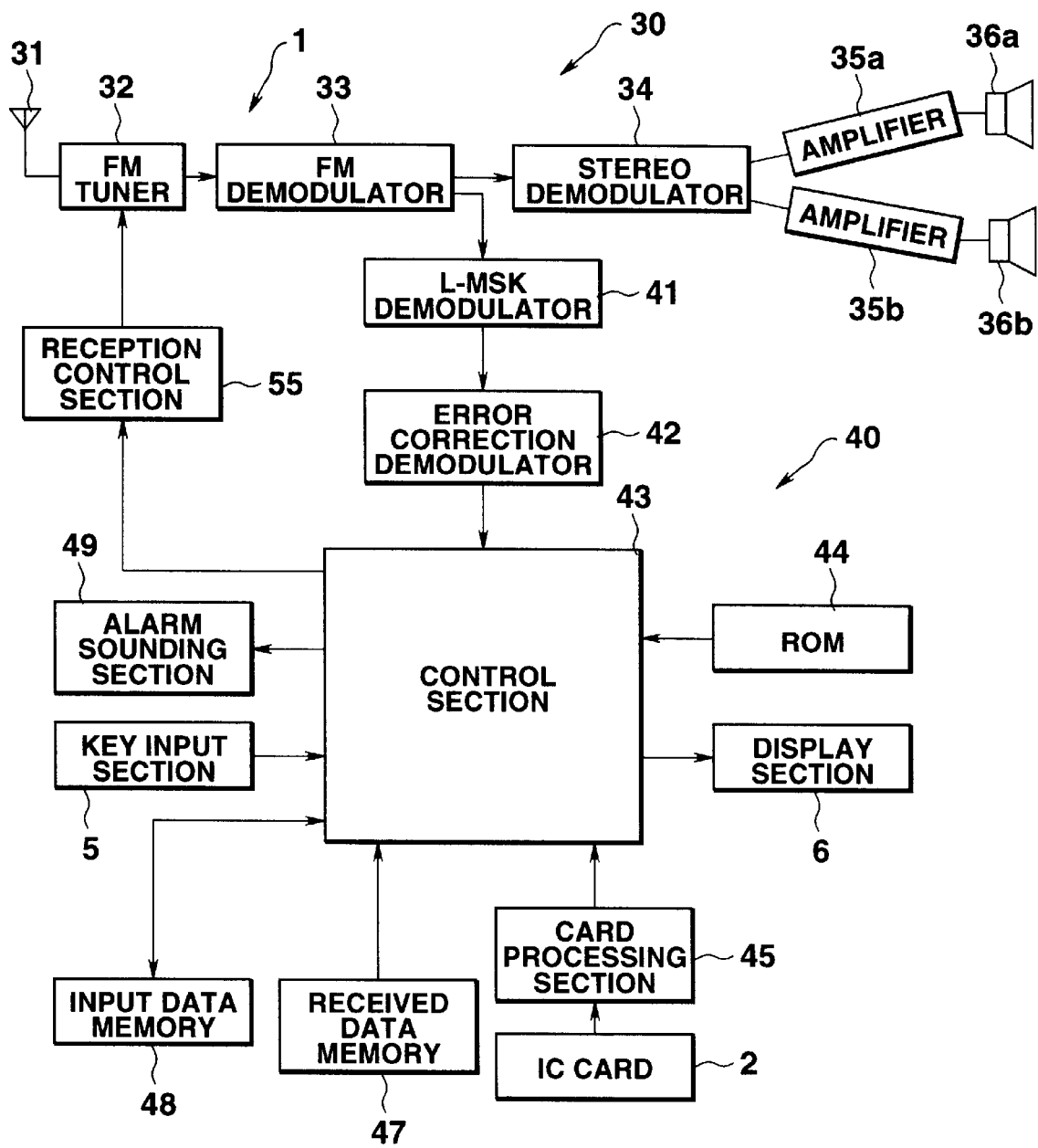
FIG. 5 is a block diagram of the service information receiving device.

FIG. 5 is a block diagram of the service information receiving device 1, which comprises an FM broadcast receiving section 30 that receives FM broadcast radiowaves and produces the corresponding sound and a service information receiving section 40 that performs various processes associated with the reception of the pay and free service information multiplexed into the FM broadcast radiowaves received at the FM broadcast receiving section 30.

The broadcast receiving section 30 comprises an antenna 31 for receiving FM broadcast radiowaves, an FM tuner 32 for tuning in to an FM broadcast radiowave, an FM demodulator 33 for demodulating an FM signal, a stereo demodulator 34 for demodulating the demodulated FM signal into a stereo signal, a pair of amplifiers 35a, 35b for amplifying the output signals of the stereo demodulator 34, and a pair of speakers 36a, 36b for outputting the signals amplified at the amplifiers 35a, 35b in the form of sound. FM stereo broadcasts can, of course, be listened to by plugging a stereo headphone into the stereo headphone jack 19.

The service information receiving section 40 contains an L-MSK (Level Controlled Minimum Shift Keying) demodulator 41 that is connected to the FM demodulator 33 and separates the service information multiplexed in the FM broadcast radiowaves by effecting digital modulation to vary the level of the multiplex signal by 4 to 10% with respect to the modulation factor of the L and R signals in the FM stereo broadcasting, an error correction demodulator 42, and a control section 43 for performing various processes of the separated service information.

Connected to the control section 43 are a ROM (Read Only Memory) 44 that stores the processing programs for the control section 43, the key input section 5, the display section 6, a card processing section 45 that performs the process of reading the data from and writing the data into the IC card 2, a received data memory 47 that stores the received data (received information), an input data memory 48 that stores the input data (input information) from the key input section 5, an alarm sounding section 49, such as a buzzer, that gives an alarm according to the process result from the control section 43, and a reception control section 55 that performs the reception tuning of the FM tuner 32 according to the operation of the tuning key 12 in the key input section 5 or the pay reception frequency setting process explained later.

Figure 6:
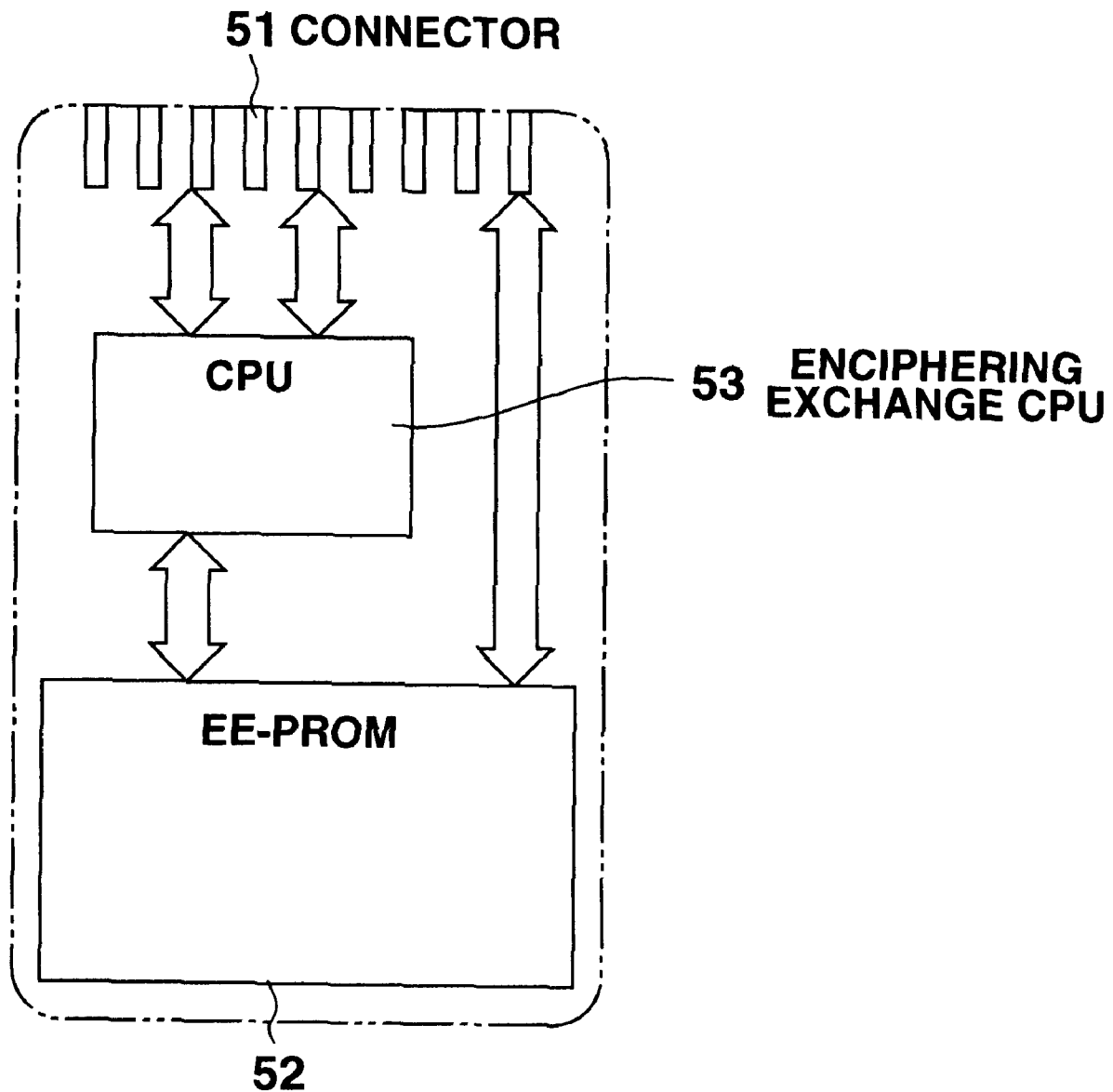
FIG. 6 is a block diagram of an IC card for use with the service information receiving device of the above embodiment.

FIG. 6 is a block diagram of the IC card 2. The IC card 2 comprises a connector 51 for data exchange with the service information receiving device 1 body, an EEPROM (Electrically Erasable Programmable Read Only Memory) 52 for storing the validity period relative value data explained later, and an enciphering exchange CPU (Central Processing Unit) 53.

Figure 7:
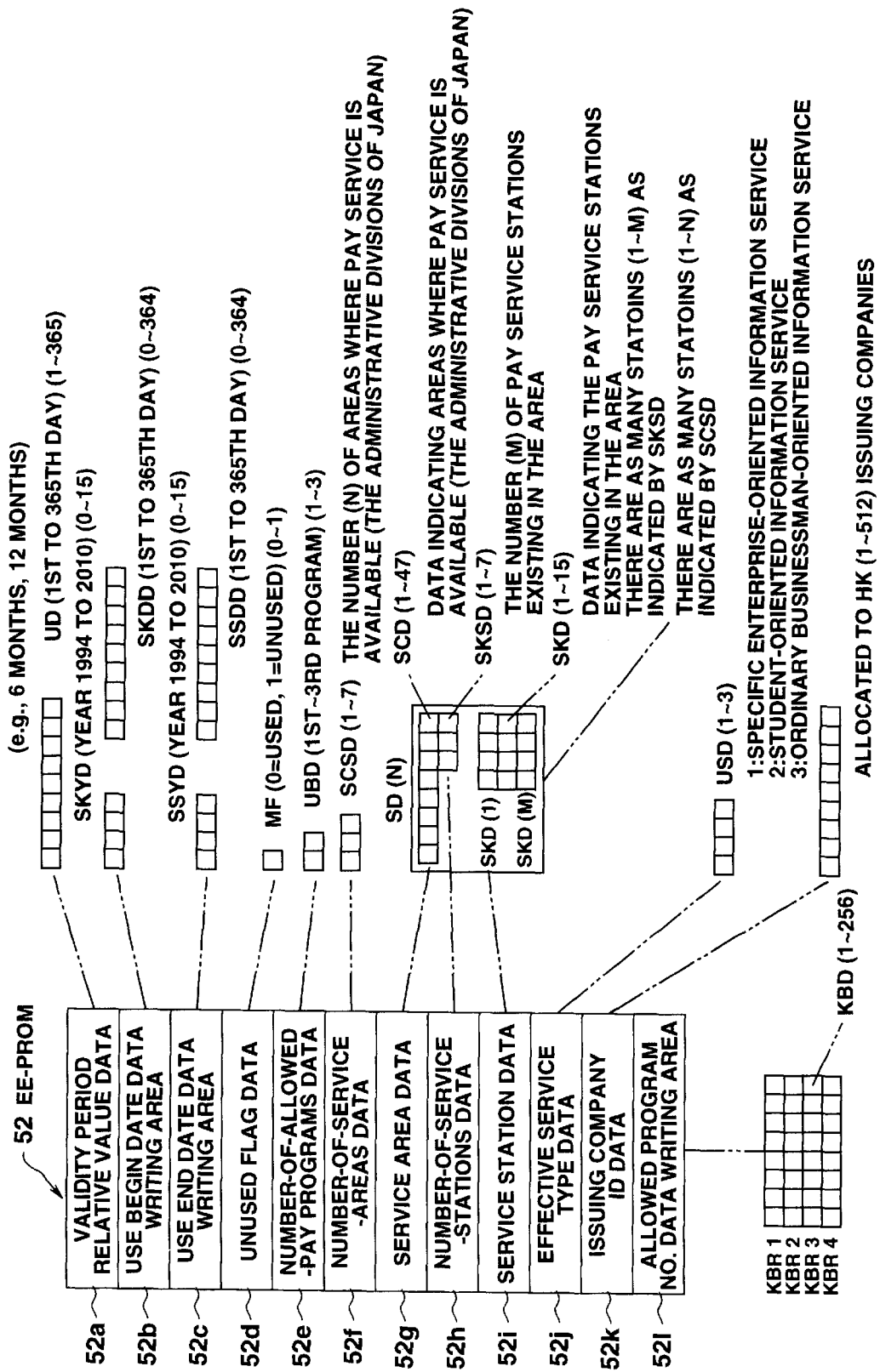
FIG. 7 is an explanatory diagram of the configuration of the EEPROM in the IC card.

FIG. 7 shows the memory area structure of the EEPROM 52 in the IC card 2. In the structure, there are provided a validity period relative value data storage area 52*a*, a use begin date data writing area 52*b*, a use end date data writing area 52*c*, an unused flag data storage area 52*d*, the number-of-allowed-pay-programs data storage area 52*e*, the number-of-service-areas data storage area 52*f*, a service area data storage area 52*g*, the number-of-service-stations data storage area 52*h*, a service station data storage area 52*i*, an effective service type data storage area 52*j*, and an issuing company ID data storage area 52*k*. The validity period relative value data storage area 52*a* has stored the validity period relative value data UD in advance, which is composed of 9-bit data indicating a relative validity period in days in the range from 1 to 365. For instance, if the validity period is six months, the data indicating "182" have been stored previously in the factory before shipment. If the validity period is 12 months, the data indicating "365" have been stored likewise.

In the use begin date data writing area 52*b*, the use begin year data SKYD and the use begin month/day-of-month data SKDD are written by a process explained later. The use begin year data SKYD is written in 4 bits of data indicating a year in the range from 1994 to 2010. The use begin month/day-of-month data SKDD is written in 9 bits of data indicating one of 0 to 364 corresponding to the first to the 365th day. Therefore, for example, if the use begin date is Dec. 31, 1994, 4 bits of data indicating "1994" will be written as SKYD and 9 bits of data indicating "364" corresponding to December 31 will be written as SKDD.

In the use end date data writing area 52*c*, the use end year data SSYD and the use end month/day-of-month data SSDD are written by a process explained later. The use end year data SSYD is written in 4 bits of data indicating a year in the range from 1994 to 2010. The use end month/day-of-month data SSDD is written in 9 bits of data indicating one of 0 to 364 corresponding to the first to the 365th day. In addition, in the unused flag data writing area 52*d*, flag MF=1 indicating unused has been written previously in the factory before shipment. The flag MF will be rewritten into MF=0 indicting already in use at the time when the IC card 2 starts to be in use.

In the number-of-allowed-pay-programs data storage area 52*e*, the number-of-allowed-pay-programs data UBD, the maximum number of select points of pay service information, ("3" in this example) has been written previously in the factory before shipment. The number-of-pay-programs data UBD is any one of "1" to "3" corresponding to the first to the third program. In the number-of-service-areas data storage area 52*f*, the number-of-service-areas data SCSD has been stored. The number-of-service-areas data SCSD indicates the number of areas N (N=the number of administrative divisions of Japan) where the issuing company of the IC cards 2 provides pay service, using any one of 1 to 7. N items of service data SD (N) indicated by the SCSD have been stored in the following individual storage areas 52*g*, 52*h*, and 52*i*. Specifically, each of the N items of SD (N) consists of a service area data item SCD, the number-of-service-stations data item SKSD, and service station data items SKD (1) to SKD (M). The service area data item SCD has a value in the range from 1 to 47 corresponding to the areas (administrative divisions of Japan) where pay service is provided. The number-of-service-stations data item SKSD has a value in the range from a minimum value of 1 to a maximum value of 7 indicating the number of pay service stations (M) run by the issuing company of the IC cards 2. The service station data items SKD consist of data items SKD(1) to SKD(M) corresponding to the M service stations indicated in the number-of-service-stations data SKSD. These SKD (1) to SKD(M) show the station numbers.

In the effective service type data storage area 52*j*, the effective service type data USD ("2" in this example) indicating the type of users who can access the service information using the IC cards 2 has been stored. The effective service type data USD has a value in the range from 1 to 3: "1" indicates the specific enterprise-oriented service information, "2" the student-oriented service information, and "3" the ordinary businessman-oriented service information. The effective service type data USD, the number-of-pay-programs data UBD, and the validity period relative value UD vary with the type and selling price of the IC card 2. The higher the selling price of the IC cards 2, the larger values the number-of-allowed-pay-programs data UBD and the validity period relative value data UD have. In the issuing company ID data writing area 52*k*, the value assigned to the issuing company (the service center 91 also acting as a supplier of pay programs) of the IC cards 2 in the range from 1 to 512 has been written previously in the factory before shipment. For example, the information HK indicting the issuing company in the present embodiment has been written. The information showing the issuing company is not limited to numerals, but may be character data.

In the allowed program number data writing area 52*l*, the allowed program number KBD (a value in the range of 1 to N) is written by a process explained later. The allowed program number registers KBR1 to KBR3 store the program numbers which the user has decided to check visually, paying a charge. The KBR4 always stores "0."

In the ROM 44, the table shown in FIG. 8, together with processing programs, has been stored. The table stores not only the names of areas from Hokkaido to Okinawa, corresponding to the area numbers 1 to 47, but also the station numbers of FM stations existing in the individual areas, the transmitting frequencies, and the names of broadcasting stations, all according to the names of the individual areas.

Figure 9:
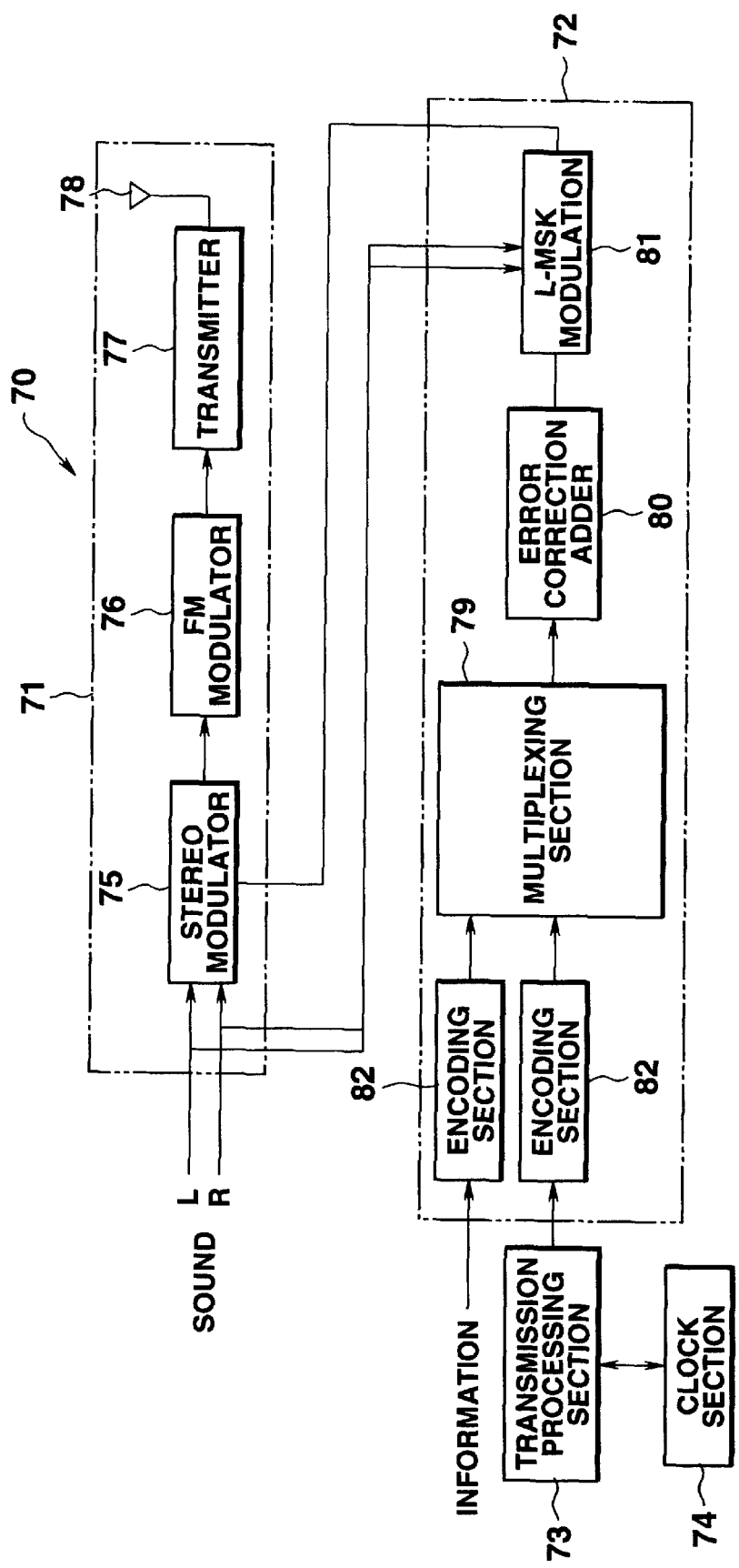
FIG. 9 is a block diagram of the service information transmitting device according to an embodiment of the invention.

FIG. 9 is a block diagram of a service information transmitting device 70 provided in the FM broadcasting station 3. The service information transmitting device 70 comprises a transmitting section 71, a multiplex processing section 72, a transmission processing section 73 that transmits the pay and free service information (as explained later)

to the multiplex processing section 72, and a clock section 74 that generates the present year/month/day of month data. The transmitting section 71 is composed of a stereo modulator 75 that performs stereo modulation of audio information, an FM modulator 76, a transmitter 77, and a transmitting antenna 78. The multiplex processing section 72 is made up of an encoding section 82, a multiplexing section 79, an error correction adder 80, and an L-MSK modulator 81.

Figure 10:
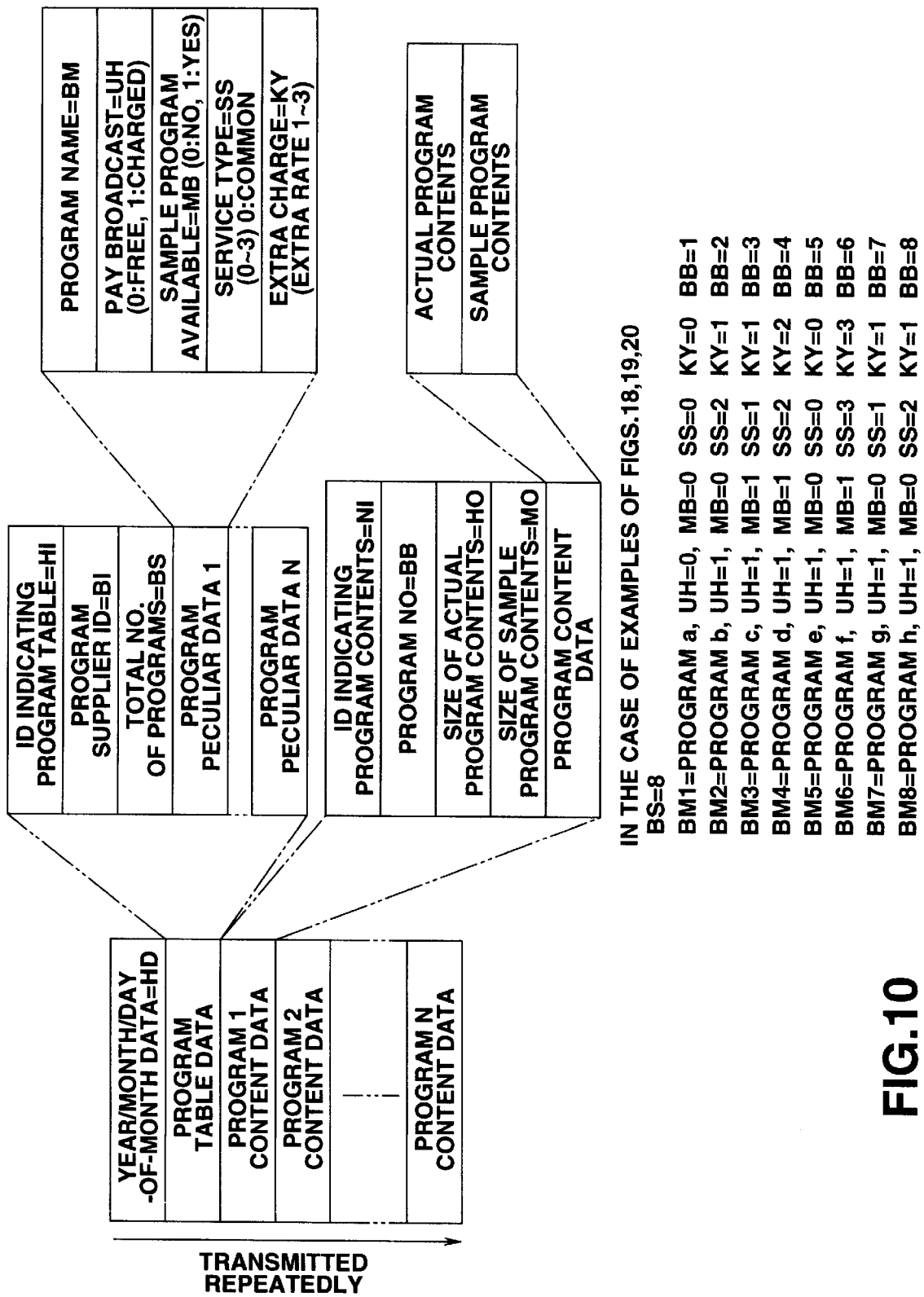
FIG. 10 shows the format of a service information transmission signal.

The transmitting signal format for the service information multiplexed into the FM broadcast radiowaves will be described with reference to FIG. 10. The transmitting information in the service information consists of the year/month/day-of-month data HD, the program table data, the content data of program 1 to program N following the table data. A series of these data items is transmitted repeatedly. The program table data consists of ID (ID=HI) indicating a program table, a program supplier ID=BI, the total number of programs BS, and program peculiar data items about program 1 to program N. Like the issuing company ID, the program supplier ID has a value in the range of 1 to 512. The program peculiar data consists of a program name BM, a pay broadcast code UH ("0" means free of charge and "1" means charged), a sample program available code MB ("0" means that no sample program is transmitted and "1" means that a sample program is transmitted), a service type code SS for identifying the service type (a value in the range of 0 to 3), and an extra charge code KY as a weighting point value for pay programs (showing an extra rate in the range of 1 to 3).

The individual values of the service type code SS mean the following:

0: the information service whose contents are common to all of the types of information service (e.g., news from abroad and local weather forecast)

1: specific enterprise-oriented information service (e.g., the business world information and the latest seller information)

2: student-oriented information service (e.g., the introduction of inexpensive restaurants and the introduction of universities)

3: general businessman-oriented information service (e.g., stock-price information and the introduction of no-frills hotels)

What is shown in the figure is the actual data, which undergoes error correction check sum and encoding and thereafter is transmitted. In the case of free programs, the extra charge code KY is KY=0. In the received data memory 47, there is provided a memory area of the same structure as that of the transmitting signal format shown in FIG. 10. All of the service information shown in the figure is stored in the memory area in the received data memory 47.

Using the flowcharts shown in FIGS. 11 and later, the operation of the service information receiving device 1 will be described. In the flow, the following data items and the registers in the control section 43 are used:

Year/month/day-of-month HD: consists of 4-bit data indicating the year 1994 to the year 2010 and 9-bit data having a value in the range of 0 to 364 corresponding to the first day to the 365th day, like the use end year data SSYD and the use end month/day-of-month SSDD Present year data register GYR: contains 4 bits and stores the present year in the range from the year 1994 to the year 2010

Present month/day-of-month data register GDR: contains 9 bits and stores the present month/day-of-month in the range of 0 to 364 corresponding to the first day to the 365th day (Here, GR indicates both of the registers GYR and GDR)

Date computing register HZR: stores the interim data in calculating the use end date.

Expiration register KGR: "0" means within the expiration and "1" means beyond the expiration.

Program allowance computing register BZR: stores the interim data in calculating the number of allowed programs.

Counter N: counts the number of areas where pay service is provided.

Counter M: counts the number of pay service stations.

Register X: temporarily stores the data indicating pay service stations.

Increment register NR: stores a value specifying one of KBR1 to KBR4.

Figure 11:
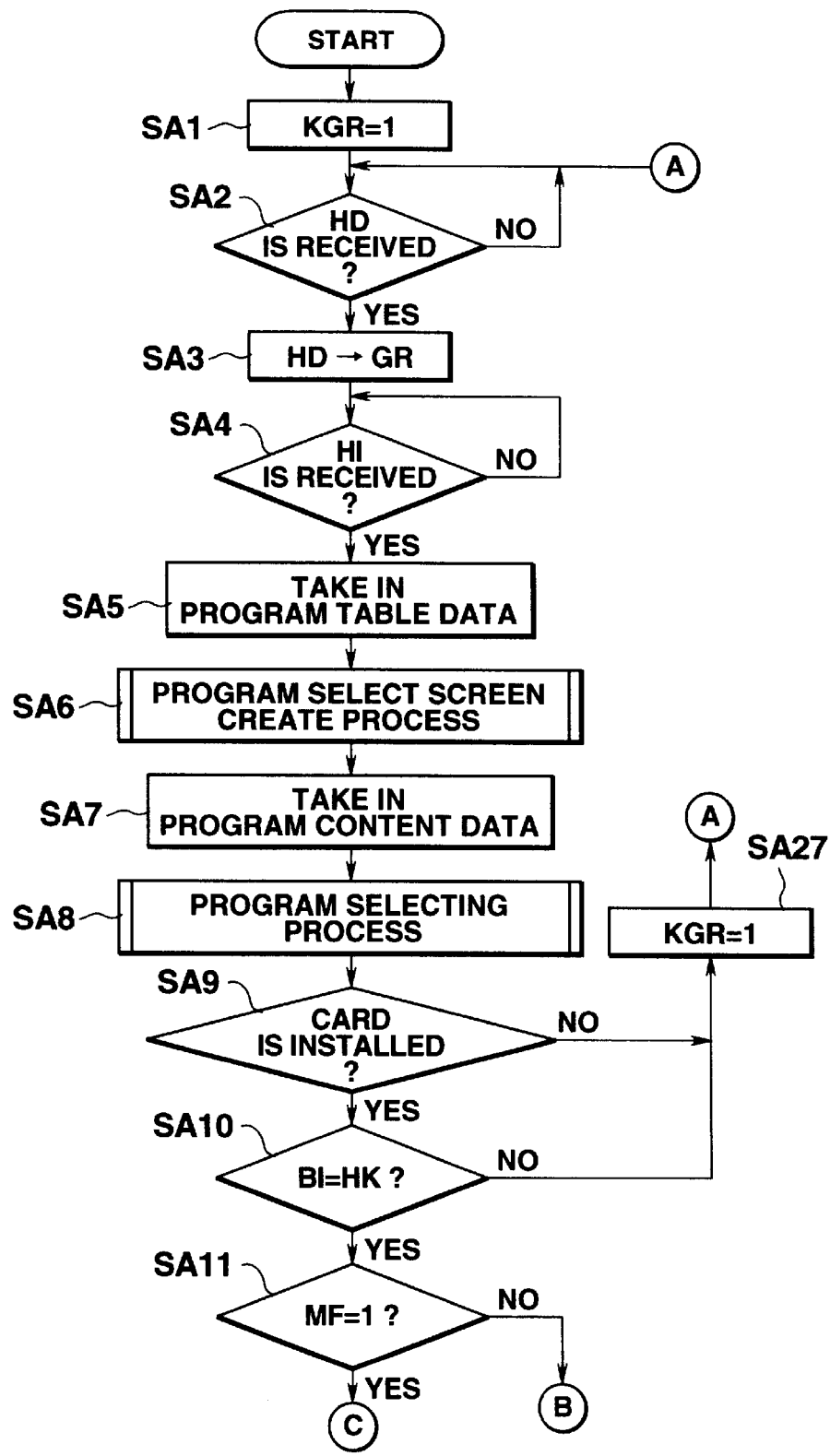
FIG. 11 is a flowchart for part of the processing of the service information receiving device according to the above embodiment.
Figure 12:
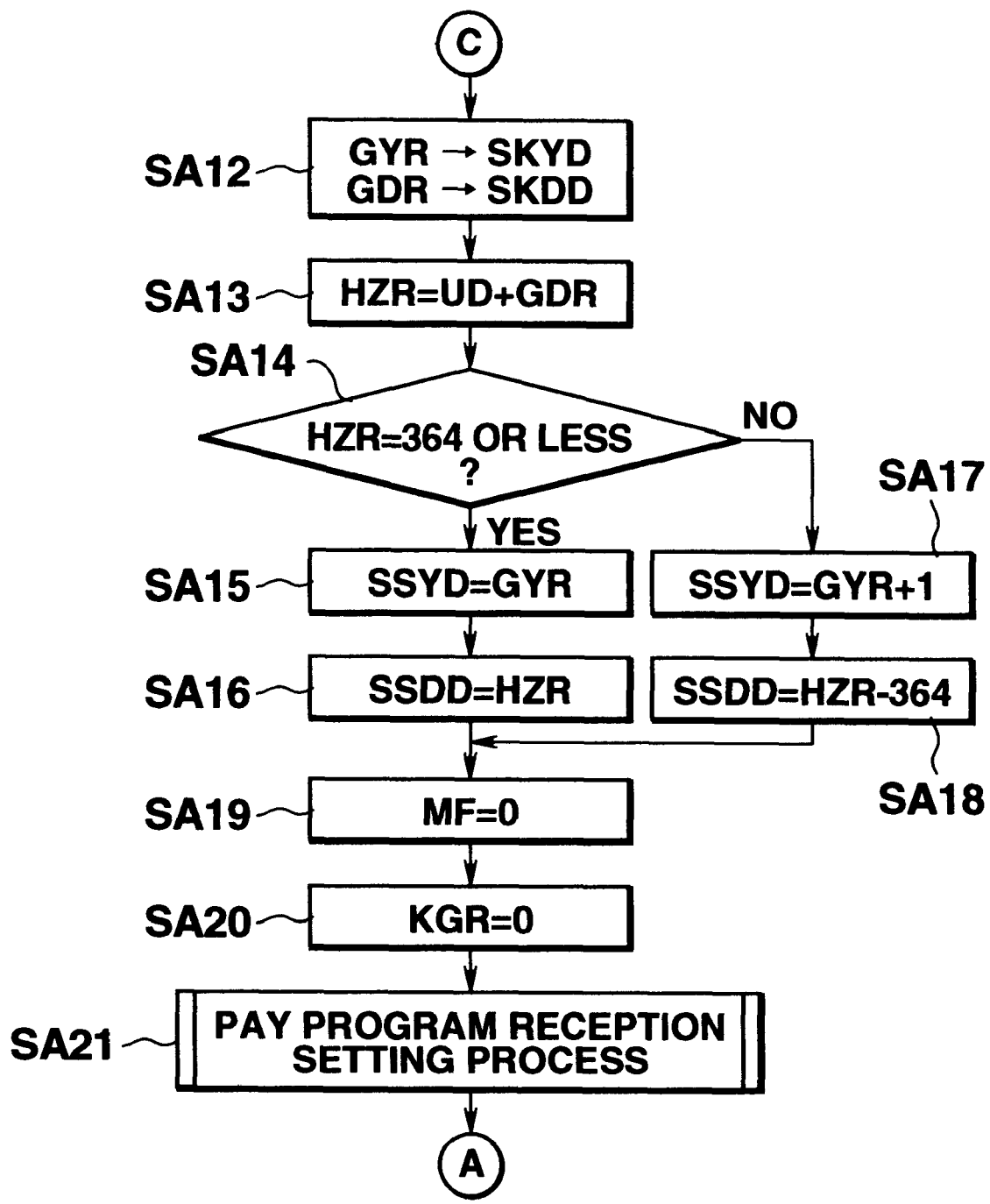
FIG. 12 is a flowchart following FIG. 11.
Figure 13:
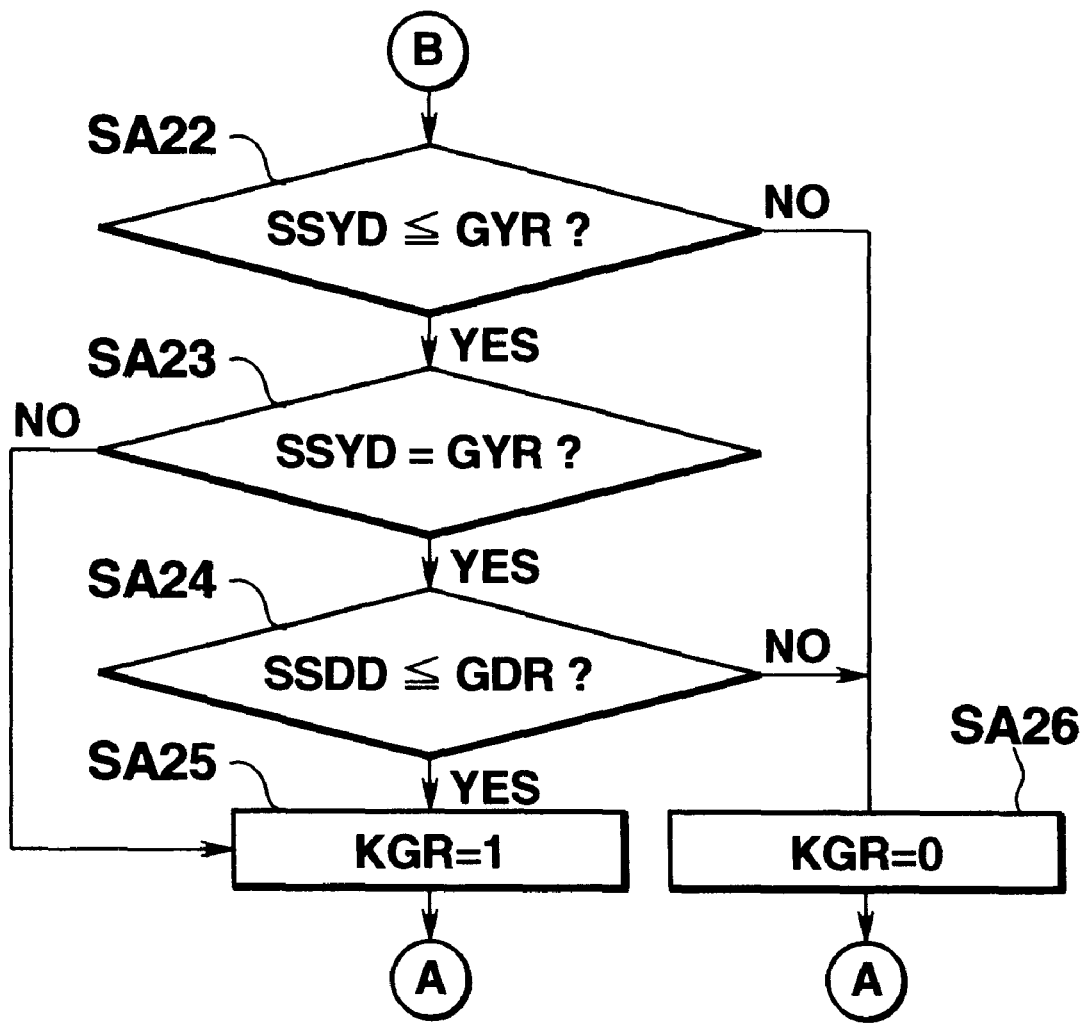
FIG. 13 is a flowchart following FIG. 11.

Specifically, as the power is turned on, the control section 43 in the service information receiving device 1 starts operation according to the flowcharts shown in FIGS. 11 to 13, sets the expiration register KGR in response to the turning on of the power supply (SA1), and monitors the reception of the year/month/day-of-month data HD (SA2). When obtaining the year/month/day-of-month data DH from the transmitted signal in the aforementioned format, the control section stores the year/month/day-of-month data HD in GR. Since GR indicates both of the registers GYR and GDR as described earlier, the 4-bit present year data in the received year/month/day-of-month data HD is stored in the present year data register GYR and the 9-bit present month/day-of-month data in the received year/month/day-of-month data HD is stored in the present month/day-of-month data register GDR (SA3).

Then, the control section monitors the reception of HI, the ID indicating the program table (SA4). If receiving HI, it will take in the program table data (SA5) and execute a program select (menu) screen create process explained later (SA6). Thereafter, the control section will take in the program content data (SA7) and execute a program selecting process (SA8) explained later. Then, the control section will senses whether or not the IC card 2 has been installed in the slot 22 (SA9). If it has not been installed, the control section will set a 1 in the register KGR (SA27) and return control to step SA2.

Then, when the IC card 2 has been installed in the slot 22, the control section will read the information HK stored in the issuing company ID data writing area 52 in the IC card 2, compare the information HK (any value in the range of 1 to 512) with BI, the program supplier's ID (any value in the range of 1 to 512), and judge whether or not they are equal (SA10). If the judgment result shows that BI≠HK, the control section will set a 1 in the register KGR (SA27) and return control to step SA2, as when the IC card 2 has not been installed as described earlier. Therefore, when the IC card has not been installed, or when HK indicating the issuing company of the IC card 2 disagrees with BI indicating the supplier of the pay program even if the IC card has been installed (because the program is not the pay program dealt with the issuing company of the IC card 2), the processes at step SA11 and later will not be carried out, with the result that the pay program reception setting process at step SA21 in FIG. 12 will not be executed either.

If BI=HK and HK indicating the issuing company of the IC card 2 coincides with BI indicating the supplier of the pay program, the control section will read the state of the flag MF stored in the unused flag data storage area 52d in the IC card 2 and judge whether or not MF=1 (SA11). If the judgment result shows that MF=1 and the IC card 2 is unused, that day will be the use begin day of the IC card 2. Therefore, the control section will write not only the present year data stored in GYR as the use begin year data SKYD into the use begin date data writing area 52*b* in the EEPROM 52, but also the present month/day-of-month data stored in GDR as the use begin month/day-of-month data SKDD into the use begin date data writing area 52*b* (step SA12 in FIG. 12).

Next, the control section reads the validity period relative value data UD from the validity period relative value data storage area 52*a* in the EEPROM 52, adds the validity period relative value data UD to the present month/day-of-month data stored in GDR, and stores the result in the date computing register HZR (SA13). Then, it judges whether or not the value of HZR is 364 or less (SA14). If the value of HZR is 364 or less, the use end day can be represented by using the present year and the present month/day-of-month+ the validity period relative value data, without carrying up the value of the year.

Therefore, in this case, the control section writes not only the present year data stored in GYR as the use end year data SSYD into the use end date data writing area 52*c* (SA15), but also the present month/day-of-month+the validity period relative value data stored in HZR as the use end month/day-of-month data SSDD into the use end date data writing area 52*c* (SA16). Thereafter, to indicate that the IC card 2 is now in use, the control section resets the flag MF (SA19), and then resets KGR to indicate that the IC card 2 is within the validity period of pay service information reception (SA20). The control section then executes a pay program reception setting process explained later (SA21) and returns control to step SA2.

If the judgment result at step SA14 shows that the value of HZR has exceeded 364, the use end day cannot be expressed using the values ranging from 0 to 364 corresponding to the first day to the 365th day, without carrying up the value of the year. Therefore, the control section increments the value of the present year data stored in GYR and writes the incremented value as the use end year data SSYD into the use end date data writing area 52*c* (SA17). Then, the control section subtracts 364 from the present month/day-of-month+the validity period relative value data stored in the HZR and writes the result as the use end month/day-of-month data SSDD into the use end date data writing area 52*c* (SA18). Thereafter, the control section carries out the steps SA19 to SA 21 and returns control to step SA2.

If the judgment result at step SA11 shows that MF=0, this means that the IC card 2 is already in use. When the card is now in use, the control section will compare the use end year data SSYD with the present year data stored in GYR and judges whether or not SSYD≦GYR (step SA22 in FIG. 13). As a result of the judgment, if SSYD≦SGYR does not hold, it is apparent that the IC card 2 has not expired at that point of time. Therefore, the control section sets a 0 in the expiration register KGR to indicate that the card is within the expiration (SA26) and returns control to step SA2.

If at step SA22, SSYD≦GYR holds, it is possible that the use end year data coincides with the present year data. Then, the control section judges whether or not SSYD=GYR holds (SA23). As a result of the judgment, if SSYD=GYR, the control section will compare the use end month/day-of-month data SSDD with the present month/day-of-month data stored in GDR and judge whether or not SSDD≦GDR holds (SA24). As a result of the judgment, if SSDD≦GDR does not hold, this means that the IC card 2 is within the expiration and therefore the control section will set a 0 in the expiration register KGR to indicate that the card is within the expiration (SA26). If at step SA24, SSDD≦GDR, the IC card 2 has expired already and therefore the control section will set a 1 in KGR to indicate that the card has expired (SA25) and return control to step SA2. If at step SA23, it has been judged that SSYD=GYR does not hold, it is apparent that the IC card 2 has expired already at that time. Therefore, the control section sets a 1 in KGR at step SA25 and returns control to step SA2.

Figure 14:
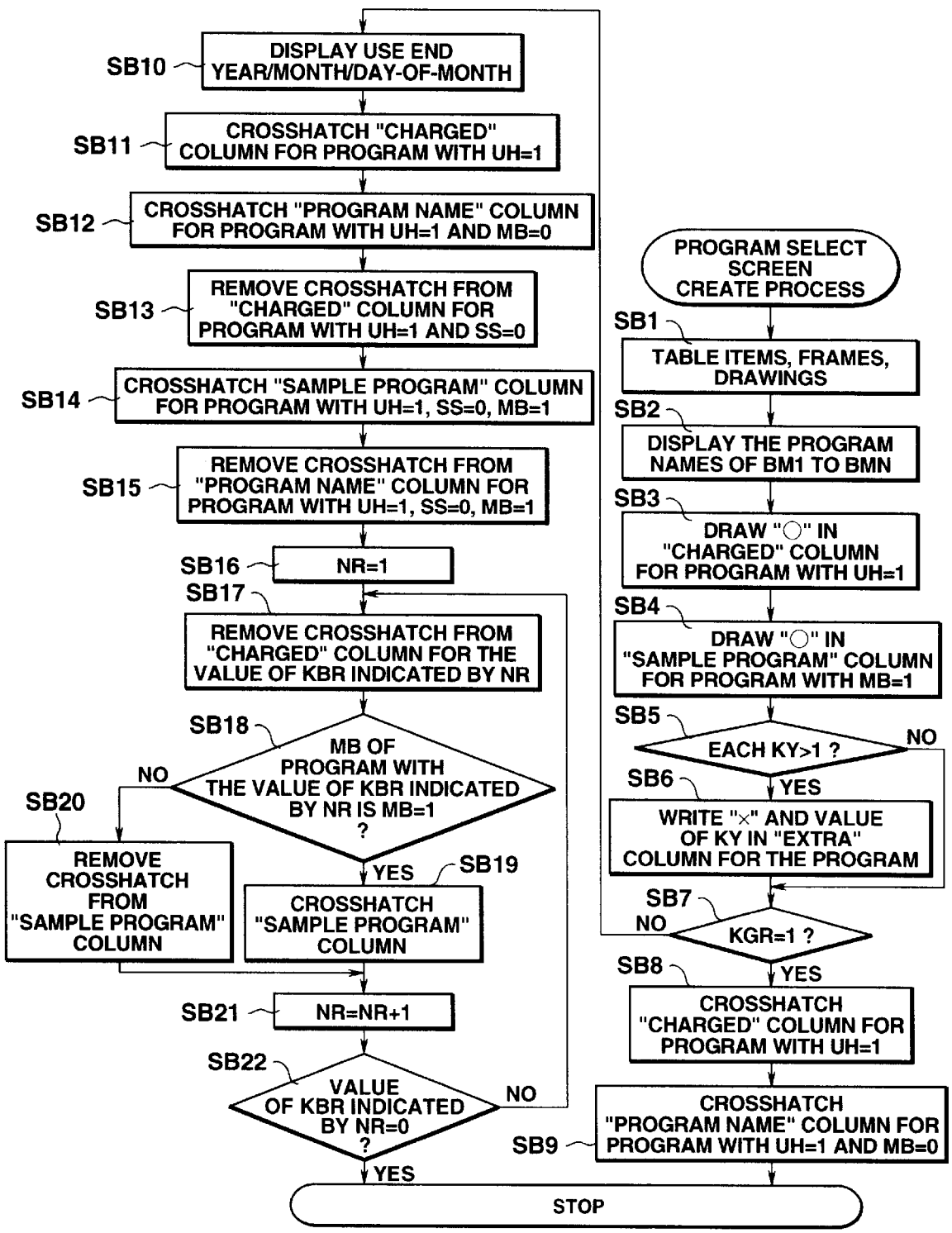
FIG. 14 is a flowchart for the program select screen create process.

The program select screen create process (SA6) is carried out according to the flowchart shown in FIG. 14. In the process, table items and frames are drawn (SB1) and then program names BM1 to BMN are displayed (SB2). By the processes at steps SB1 and SB2, the table items including "Program Name", "Charged", "Sample Program", and "Extra" are displayed together with the frames on the display section 6 as shown in FIG. 18. Then, "○" is drawn in the "Charged" column for the program with pay broadcast code UH=1 (SB3). At the same time, "○" is drawn in the "Sample Program" column for the program with sample program available code MB=1.

Next, the control section judges whether or not there is any program whose extra charge code KY exceeds 1 (SB5). If KY=0 or KY=1, the control section will not execute the process at step SB6 and pass control to step SB7. If KY=2 or 3, the control section will draw "x" and the value of KY in the "Extra" column for the program (SB6). Therefore, for example, if the received signal has the data shown in FIG. 10, "Program a" to "Program h" will be displayed in the "Program Name" column, "○" be displayed so as to correspond to "Program b" to "Program h" in the "Charged" column, "○" be displayed so as to correspond to "Program c", "Program d", and "Program f" in the "Sample Program" column, and "x2" and "x3", be displayed so as to correspond to "Program d" and "Program f" in the "Extra" column, respectively.

At step SB7 following step SB5 or step SB6, it is judged whether or not the expiration register KGR meets KGR=1. Since the KGR is set during initialization at step SA1 in FIG. 11, KGR=1 holds at the start-up. Therefore, the "Charged" column for the program with pay broadcast code UH=1 is crosshatched (SB8) and the "Program Name" column for the program with UH=1 and sample program available code MB=0 is also crosshatched (SB9). By the processes at steps SB8 and SB9, the "Program Name" column for "Program b", "Program e", "Program g", and "Program h" and the "Charged" column for "Program b" to "Program h" are crosshatched as shown in FIG. 18. Namely, the crosshatching of the "Program Name" column indicates that they are pay programs without a sample program, and the crosshatching of the "Charged" column indicates that they are pay programs that cannot be displayed.

If KGR≠1, or if the IC card 2 is within the validity period, control will proceed from step SB9 to step SB10, where the use end year/month/day-of-month will be displayed on the basis of the use end year data SSYD and the use end month/day-of-month data SSDD stored in the use end date data writing area 52*c* of the IC card 2. Thereafter, at step SB11, the "Charged" column for the program with pay broadcast code UH=1 will be crosshatched and the "Program Name" column for the program with UH=1 and sample program available code MB=0 will be crosshatched (SB12). Next, the crosshatching of "Charged" column for the program with UH=1 and service type code SS=0 will be canceled (SB13). This means that the program with UH=1 and SS=0 allows pay visual check as long as it is within the validity period, regardless of the pay program reception setting process explained later. Of the programs from which the crosshatch of the "Charged" column has been removed at step SB13, the "Sample Program" column with sample program available code MB=1 will be crosshatched (SB14) and the crosshatch of the "Program Name" column with sample program available code MB=0 will be removed (SB15). This means that pay visual check is possible.

Next, after "1" is set in NR (SB16), the crosshatch of the "Charged" column for the value of KBR indicated by NR is removed (SB17). Here, the allowed program number data writing area 521 is composed of allowed program number registers KBR1 to KBR4. In each of KBR1 to KBR3, a program number (any one of 2, 4, and 8) for which pay visual check has been determined in a process explained later is stored, starting at KBR1. In KBR4, "0" is always stored.

First, at step SB16, "1" is set in NR (NR=1). At step SB17, the crosshatch of the "Charged" column for the program number corresponding to the value of KBR1 is removed, meaning that the program with the program number has been selected for pay visual check. Next, it is judged whether or not the sample program available code MB of the program with the value of KBR1 meets MB=1 (SB18). If MB=1 holds and a sample program is present, the "Sample Program" column corresponding to the program is crosshatched (SB19). Because the program has been selected for pay visual check, this means that visual check of a sample program is unnecessary. If at SB18, MB=0 holds and a sample program is absent, the crosshatch of the "Program Name" column corresponding to the program is removed (SB20). After step SB19 or SB20, NR is incremented (SB21) and then it is judged whether or not the value of KBR indicated by the incremented NR is "0" (SB22). If it is not "0", control returns to step S17. If it is "0", the program select screen create process will be terminated.

Therefore, for example, when all of KBR1 to KBR3 have stored program numbers, the loop of SB16 to SB21 is repeated three times. When NR=4 is reached, control will proceed to a stop process because KBR4 is always "0". Furthermore, for example, when "BM2=Program b" and "BM4=Program d" (BM4=Program d means that a sample program is present) have been selected previously, the loop is repeated twice, with the result that the "Charged" column of "Program c", "Program f" to "Program h" and the "Program Name" column of "Program g" and "Program h" remain crosshatched, and the "Sample Program" column of "Program d" is crosshatched. Specifically, the crosshatching of the "Charged" column indicates the pay program that is not selected or cannot be selected. The crosshatching of the "Sample Program" column indicates that the pay program has been selected and pay visual check of a sample program cannot be allowed. At this time, the use end year/month/day-of-month is also displayed.

Figure 15:
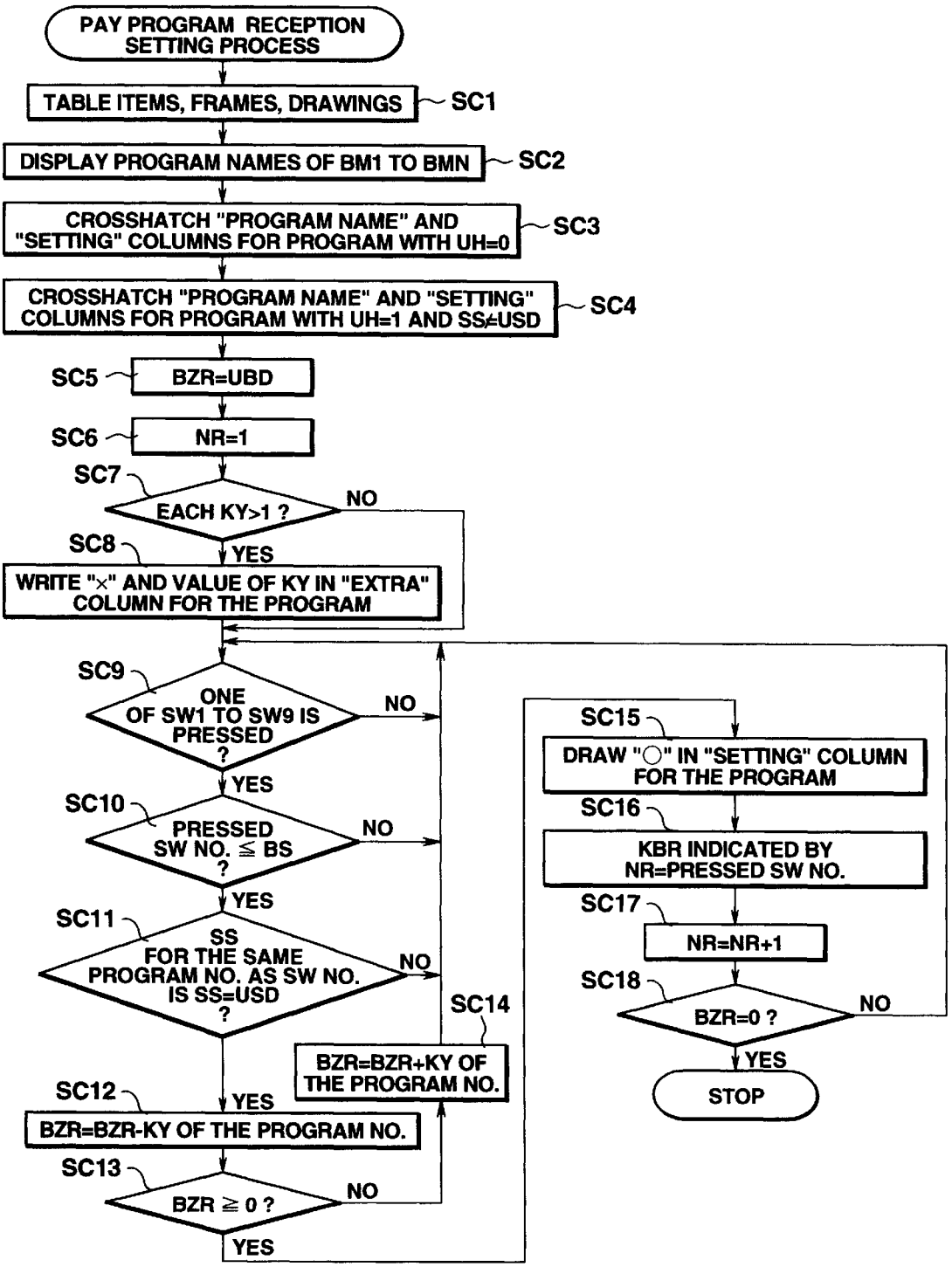
FIG. 15 is a flowchart for the pay program reception setting process.

The pay program reception setting process (SA21) is carried out according to the flowchart of FIG. 15. After the table items and frames have been drawn (SC1), the program names of BM1 to BMN are displayed (SC2). Furthermore, the "Program Name" column and "Setting" column for pay broadcast code UH=0 (free) are crosshatched (SC3) and the "Program Name" and "Setting" columns for UH=1 (charged) and service type code SS≠effective service type data USD are crosshatched (SC4). By the processes at steps SC1 to SC4, the table items and frames for "Program Name", "Setting", and "Extra" are displayed on the display section 6 as shown in FIG. 20. In addition, "Program a" to "Program h" are displayed in the "Program Name" column, and the "Program Name" column and "Setting" column for "Program a", "Program c", and "Program e" to "Program g" that are free programs and pay programs not can be selected, are crosshatched. This brings into a crosshatch-free state "Program b", "Program d", and "Program h" that are pay programs with SS=2 can be selected, making it easy to identify them.

Next, the value (any one of 1 to 3) of the number-of-allowed-pay-programs data UBD is stored in the program allowance computing register BZR (SC5) and "1" is set in NR as the initial value (SC6). Then, it is judged whether or not the extra charge code KY for each program KY>1 holds (SC7). If all of the programs meet KY≦1, the process at step SC8 will not be performed and control will go to step SC9. If there is a program or programs with KY>1, "x" and the value of KY is written in the "Extra" column for the program (SC8). Therefore, in the embodiment where "Program d" and "Program f" meet KY>1, "x2" is displayed in the "Extra" column for "Program d" and "x3" in the "Extra" column for "Program f" as shown in FIG. 20.

At step SC9 following step SC7 or step SC8, it is judged whether or not one of SW1 to SW9 is pressed. Here, SW1 to SW9 are the keys corresponding to "1" to "9" in the alphanumeric key group 11, with the alphabet/numeral select key 9 in the numeral select position. If any one of these SW1 to SW9 has been pressed, it is judged whether or not the pressed SW number is equal to or smaller than the total number of programs BS (in the embodiment, BS=8). If it is not equal to or smaller than BS, control will returns to SC9. If it is equal to or smaller than BS, it is judged whether or not it is service type code SS=USD for the program number equal to the SW number (SC11). If SS≠USD holds and it is a program that cannot be selectively set, control will return to step SC9. If SS=USD holds and it is a program that can be selectively set, the value of the extra charge code KY of the program number will be subtracted from the present value of the program allowance computing register BZR and the value of BZR will be updated (SC12).

Then, it is judged whether or not the program allowance computing register BZR≧0 holds (SC13). If BZR≧0 holds, control will go to step SC15. If the condition of BZR≧0 is not fulfilled, this means that the pay programs that exceeds the number-of-allowed-pay-programs data UBD set in BZR at step SC5 has been selected and therefore visual check of the selected pay programs cannot be allowed. Therefore, in that case, the extra charge code KY for the program number is added to the present value in the program allowance computing register BZR to return the value in the BZR to the value before the process at step SC12 (SC14), and the processing is started at step SC9 again.

If BZR≧0, this means that pay programs have been selected in the range indicated by the number-of-allowed-pay-programs UBD, so that "○" will be drawn in the "Setting" column for the program (SC15). Then, after the SW number (program number) has been stored in the KBR shown by NR (SC16), NR is incremented (SC17) and the loop of step SC9 to step SC18 is repeated until BZR=0 is reached (SC18). At the time when BZR=0 is reached, the pay program reception setting process will be terminated. Therefore, if the number-of-allowed-pay-programs data UBD is "3" and the effective service type data USD is "2" and the SW2 and SW4 are pressed in that order, "○" will be displayed in the "Setting" column for "Program b" and "Program d" by the process at step SC15 as shown in FIG. 20. Then, the process at step SC16 will give KBR1=2 and KBR2=4, allow KBR3=0 and KBR4=0 to remain unchanged, and give BZR=3-1-2=0. Thereafter, the pay program reception setting process will be terminated.

At this time, as shown in FIG. 20, the value of the "Number of Settable Programs" is displayed. The value of the "Number of Settable Programs" decreases from 3 to 2 and to 0 in this example, indicating the number of programs that can be set. While visually checking the number of settable programs, the user can perform the setting operation.

Figure 16:
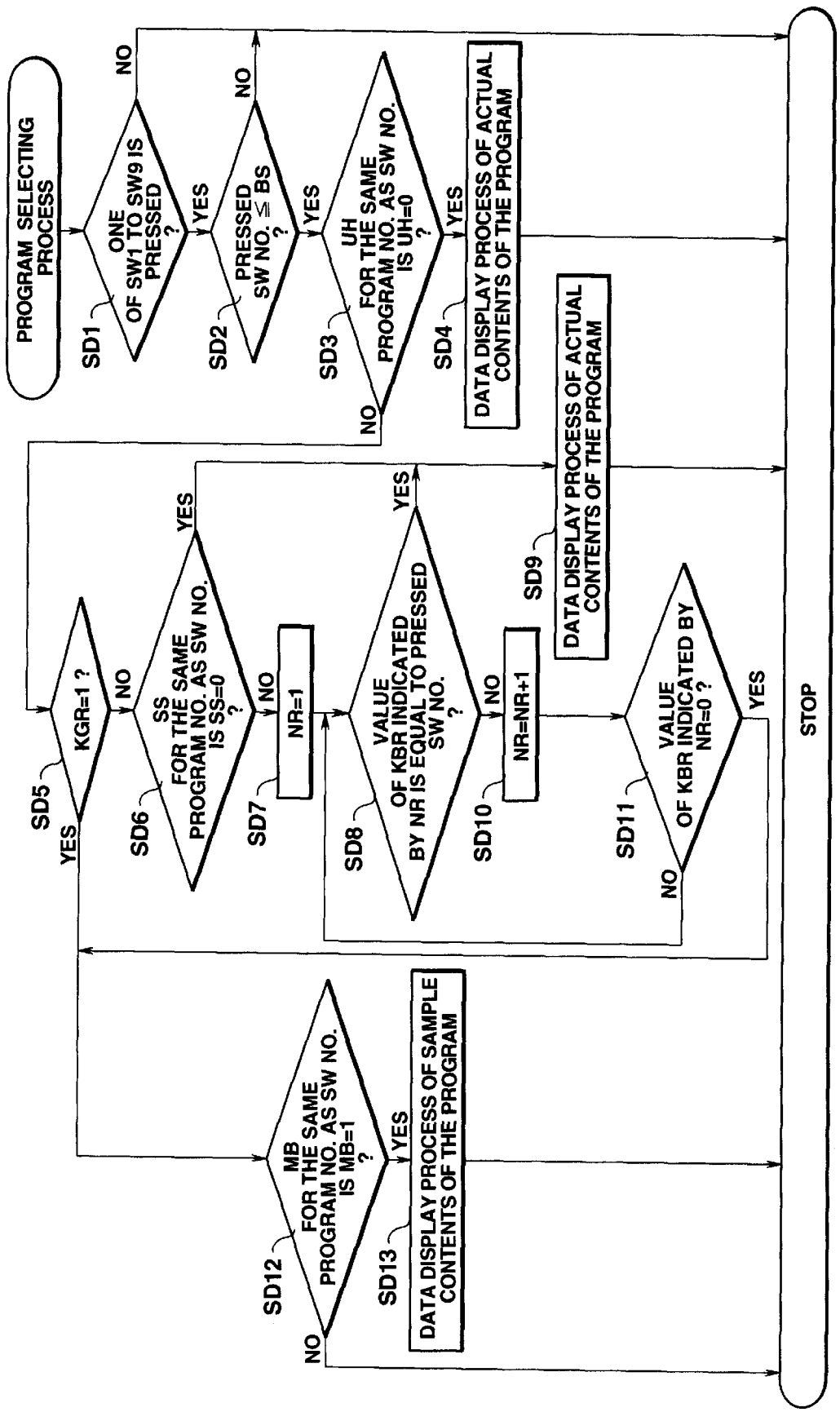
FIG. 16 is a flowchart for the program selecting process.

The program selecting process (SA9) is performed according to the flowchart of FIG. 16. First, it is judged whether or not any one of the SW1 to SW9 has been pressed (SD1). If any one of the SW1 to SW9 have been pressed, it will be judged whether or not the pressed SW number is equal to or less than the total number of programs BS (SD2). If it is equal or less than BS, it will be judged whether the pay broadcast code UH for the same program number as the SW number is "0" (SD3). If it is UH=0 and free, the actual program content data of the program will be subjected to a display process immediately (SD4). By the process at step SD4, the actual program contents of the free program (in this example, "Program a") stored in the memory area in the received data memory 47 is read out and displayed on the display section 6.

If the judgment result at step SD3 shows that the pay broadcast code is UH=1 and a pay program, it will be judged whether or not the expiration register KGR has a 1, or whether the IC card 2 has expired or not installed in the slot 22 (SD5). If KGR=0 and the IC card is within the validity period, it will be judged whether or not the service type code SS for the same program number as the SW number is "0" (SD6). If the service type code is SS=0 and a pay program whose contents are common to all types of information services, the actual program content data of the program will be subjected to the display process (SD9). If the service type code SS is not SS=0, "1" will be set in NR (SD7). Next, it will be judged whether or not the value of KBR indicated by NR is equal to the number of the pressed SW (SD8). If they are the same, the actual program content data of the program will be subjected to the display process (SD9). If they are not equal to each other, NR will be incremented (SD10) and it will be judged whether or not the value of KBR indicated by NR is "0" (SD11). If it is not "0", control will return to step SD8. If it is "0", control will proceed to step SD12.

Specifically, in the pay program reception setting process of FIG. 15, when the same SW as the SW pressed in the selecting operation is pressed, the value of KBR indicated by NR never fails to be equal to the pressed SW number in step SD8. In the example of the pay program reception setting process of FIG. 15, SW2 and SW4 are pressed in that order, and the process at step SC16 gives KBR 1=2 and KBR2=4 and sets KBR3=0 and KBR4=0. Therefore, during the program selecting process, when SW2 is pressed, KBR1 indicated by NR=1 has a value of 2 at the time when NR=1, allowing the number of SW2 to be equal to "2", at step SD8 the value of KBR1. Then, at step SD9, the program contents of "Program b" with program number "2" is displayed on the display section 6.

Furthermore, during the program selecting process, when SW4 is pressed, KBR2 indicated by NR=2 has a value of 4 at the time when NR=2, allowing the number of SW4 to be equal to "4", the value of KBR2 at step SD8. Then, at step SD9, the program contents of "Program d" with program number "4" is displayed on the display section 6. Thus, by operating the SW with the same number as that during the pay program reception setting process, the contents of the pay program for which visual check has been determined can be checked visually.

In the example, because KBR 3=0 and KBR4=0 have been set as described earlier, when KBR3 indicated by NR=3 is KBR 3=0 at the time when NR=3, control will go from step SD11 to SD12. Even if a certain program number is stored in KBR3, however, because "0" is always stored in KBR4, control will proceed from step SD11 to SD12 at the time when NR=4.

Then, when with the service type code SS≠0, a SW whose number is different from that during the pay program reception setting process, and when with KGR=1, the IC card 2 has expired or not been installed in the slot 22, it will be judged at step SD12 following step SD5 or SD11 whether or not the sample program available code MB for the same program number as the SW number is MB=1 (SD12). If the sample program available code is MB=0 and there is no sample program, the program selecting process will be terminated. If the sample program available code is MB=1 and a sample program is present, the sample program content data for the program will be displayed (SD13).

Therefore, by operating the SW whose number is different from that during the pay program reception setting process, if another program that has not been selected has a sample program, the sample program can be checked visually. If the IC card 2 has expired or not been installed, the operation of a SW whose number is equal or less than the total number of programs BS enables a sample program, if any, to be checked visually as required. After having checked the sample program visually, when the user judges that it is necessary to check the contents of the actual program visually, he or she will possibly buy a new IC card 2, leading to more frequent purchase of IC cards 2.

Figure 17:
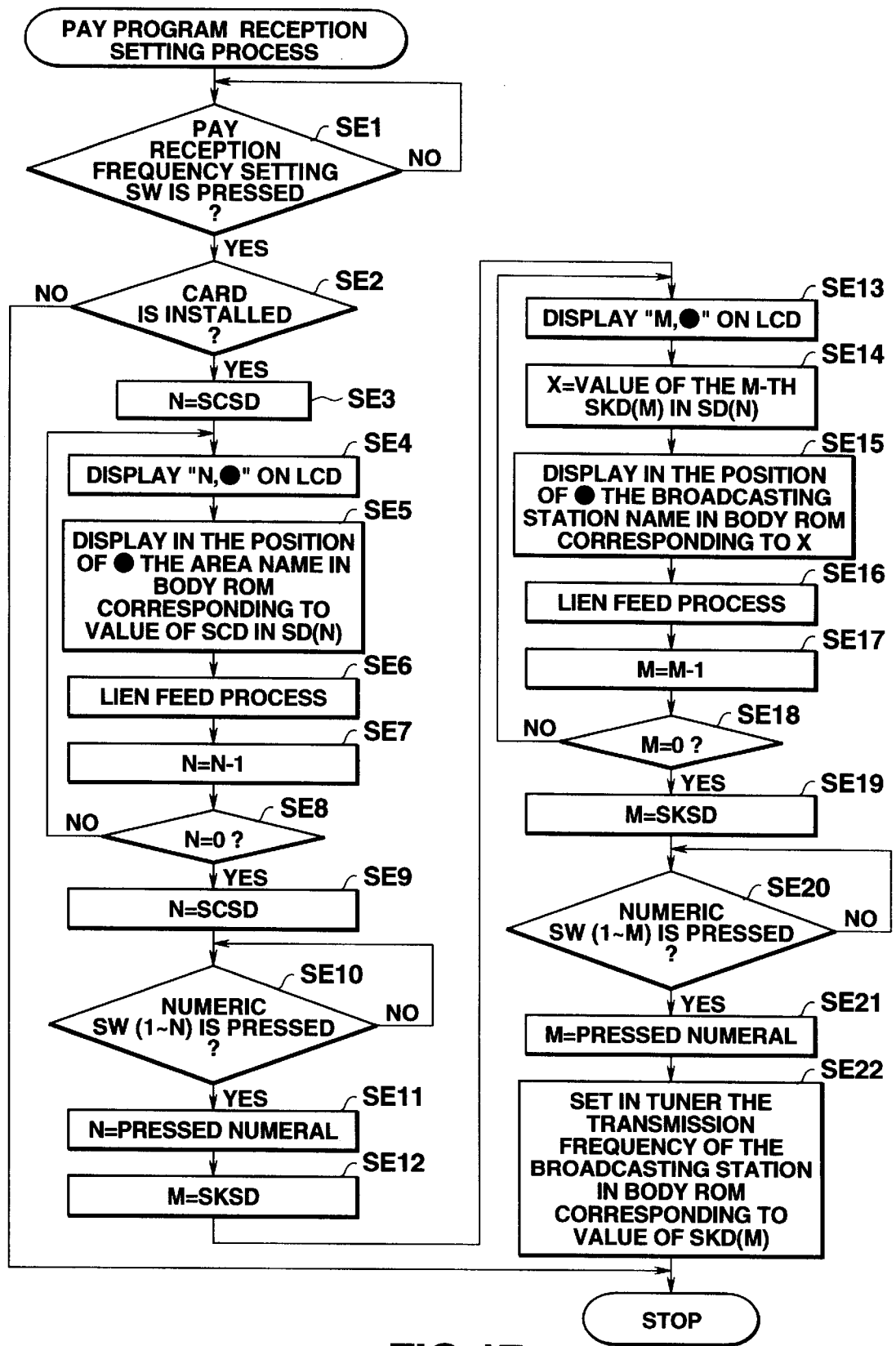
FIG. 17 is a flowchart for the pay reception frequency setting process.

After the power supply SW21 has been turned on, the control section 43 operates according to the flowchart of FIG. 17 and monitors the operation of a pay reception frequency setting SW15 (SE1). Then, the control section remains in the wait state until the pay reception frequency setting SW15 is operated. If the pay reception frequency setting SW15 is operated to visually check the pay programs provided by the issuing company of IC cards 2, control will proceed to step SE2, where it will be judged whether or not an IC card 2 has been installed in the slot 22. If an IC card 2 has not been installed, the pay reception frequency setting process will be terminated. If an IC card 2 has been installed, the value indicated by the number-of-service-areas data SCSD stored in the number-of-service-areas data storage area f in the IC card 2 is stored in counter N (SE3), and "N (the value of counter N), ●" are displayed on the LCD (display section 6) (SE4). Then, the place name in the body ROM 44 corresponding to the value of SCD in SD(N) indicated by the value of the counter N is displayed at the position of ●. Specifically, as the service area data SCD, SD(N) contains the values ranging from 1 to 47 corresponding to the administrative divisions of Japan. On the other hand, the ROM 44 in the system body contains the area names corresponding to the area numbers ranging from 1 to 47 as explained in FIG. 8. Then, the area name with the area number corresponding to SCD is read from the ROM 44 and displayed next to the value of N.

Next, the line feed process is performed (SE6) and the counter N is decremented (SE7). The loop of step SE4 to SE7 is repeated until counter N=0 is reached. Therefore, the loop is repeated N times until N=0 is reached. For example, when N=7, a serial number and an area name are displayed in each line as follows:

"7, Aomori"
"6, Tokyo"
.

.

"1, Yamanashi"

Then, at step SE9 following step SE8, the value of SCSD is set in counter N again. Next, it is judged whether or not any one of the numeral SWs (1 to N) in the range indicated by the value of the counter N has been pressed, or whether or not any one of the numeric keys 1 to N (N=1, 2, . . . 0) shown in FIG. 2 has been pressed (SE10). If any one of numeric keys 1 to N has been pressed, the number of the pressed key is set in counter N (SE11), and the value of the number-of-stations data SKSD is set in counter M (SE12). Next, after "M (the value of counter M), ●" has been displayed on the LCD (display section 6) (SE13), the value of the Mth SKD (M) in SD(N) indicated by the value of counter N is stored in register X (SE14). Furthermore, the name of the broadcasting station in the body ROM 44 corresponding to the value of the register X is displayed at the position of ● (SE15).

As described earlier, the SD(N) to SD(1)—the data groups for the individual areas—contain data SKD(1) to SKD(M) indicating the pay service stations in the individual areas. On the basis of the number sensed at step SE10, any one of the areas corresponding to SD(N) to SD(1) has been selected already. In the selected area, there are more than one service station corresponding to data SKD(1) to SKD(M). On the other hand, in the ROM 44 in the system body, a station number, a transmission frequency, and a broadcasting station name are stored for each area name as shown in FIG. 8. Then, in the already selected area, the broadcasting station name with the station number corresponding to the value of SKD(M) is read from the ROM 44, and is displayed next to the value of M.

Next, the line feed process is performed (SE16) and the counter M is decremented (SE17). The loop of step SE13 to SE18 is repeated until counter M=0 is reached. Therefore, the loop is repeated M times until M=0 is reached. If in the example, numeral SW "7" is pressed and M=5 holds, a serial number and a name of pay service station existing in the previously selected area (Aomori) will be displayed in each line as follows.

"5, K station"
.

.

"2, Z station"
"1, X station"

Then, at step SE19 following step SE18, the value of SKSD is set in counter M again. Next, it is judged whether or not any one of the numeric SWs (1 to M) in the range indicated by the value of the counter M has been pressed, or whether or not any one of the numeric keys 1 to N (N=1, 2, . . . 0) shown in FIG. 2 has been pressed (SE20). If any one of the numeric keys has been pressed, the number of the pressed key is set in counter M (SE21), and the transmission frequency of the broadcasting station in the body ROM 44 corresponding to the value of SKD(M) indicated by counter M is set in a tuner (SE22). Specifically, SKD(M) indicates the station number of the pay service station further selected from the pay service stations existing in the previously selected area. As explained in FIG. 8, because the transmission frequency is stored so as to correspond to the station number for each area, the transmission frequency corresponding to the station number is set in the FM tuner 32. Therefore, in the example, if numeric SW "2" is pressed, ZMHZ of the Z station corresponding to station number 3 in "Aomori" will be set in FM tuner 32.

In the embodiment, the transmission frequency of a pay program can be set by storing in an IC card the data indicating pay service stations and storing in the body ROM the transmission frequencies corresponding to the data indicating the pay service stations. The transmission frequencies for the pay programs may be stored in an IC card without storing the transmission frequencies in the body ROM. The broadcasting stations that are broadcasting the pay programs provided by the IC card issuing company may be searched automatically for a receivable one. When only one broadcasting station is broadcasting the pay programs supplied from the issuing company of IC cards 2, the number of transmission frequencies is naturally one, so that the transmission frequency may, of course, be set in the FM tuner immediately after the pay reception frequency setting SW "15" has been pressed.

While in the embodiment, it is judged from the received year/month/day-of-month data whether or not the IC card has expired, for example, a clock circuit may be provided on the receiving device side, the time data in the clock circuit be corrected by the received data, and on the basis of the time data in the clock circuit, it may be judged whether or not the IC card have expired.

Furthermore, while in the embodiment, an IC card is used as an information storage medium, the invention is not limited to this. For example, other mediums, such as coin-shaped IC chips, stamp-shaped IC chips, or bar-code-printed cards, may be used. Additionally, for example, information storage means may be provided on the receiving device body, not on the information storage medium that can be installed and removed on and from the receiving device body and the information related to the reception of the pay service information may be written in the information storage means by wire, by radio, or a ROM writer. Still furthermore, the present invention can be applied not only to FM multiplex broadcasting systems, but also to paging systems using radio communication, and various communication and broadcasting by wire or by radio.

While in the described embodiments, the display at the pay information is inhibited when the present time has reached at the stored time, it is also possible to inhibit the receipt of the pay information.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A display information receiving device comprising:
   a receiving section which receives a plurality of kinds of display information transmitted from a display information transmitting station;
   a display which displays the display information received by said receiving section;
   a storage device which stores point value information indicative of point values;
   a selector which selects display information of a desired kind from among said plurality of kinds of display information;

17 a selection restrictor which restricts the number of kinds of display information to be selected by the selector, in accordance with the point values represented by the point value information; and a kind indication information-setter which sets kind indication information indicating the kind of display information selected by the selector; and a display control section which permits the display to display the display information selected by the selector.

2. A display information receiving device according to claim 1, wherein:

said display information is multiplexed with FM broadcast radio waves and then transmitted;

said receiving section includes a first decoder which receives the FM broadcast radio waves and decodes the FM broadcast radio waves to generate an FM broadcast sound information, and a second decoder which decodes said display information multiplexed with said FM broadcast radio waves; and the display information receiving device further comprises a sound outputting section which outputs a sound in accordance with said FM broadcast sound information decoded by said first decoder.

3. A display information receiving device according to claim 1, wherein said storage device further stores time information indicating time, and the receiving section further comprises:

a time acquiring section which acquires the present time; and a judging section which judges whether or not the present time acquired by said time acquiring section has reached at the time indicated by the time information stored in said storage device; and said display control section further includes means for inhibiting the display of the display information of the desired kind selected by the selector and transmitted from the display information transmitting station after said judging section has judged that the present time has reached the stored time.

4. A display information receiving device according to claim 1, wherein:

said display information comprises pay display information;

said receiving section includes a receiver which receives free display information; and said display includes a display which displays the free display information received by said receiving section.

5. A display information receiving device according to claim 1, wherein:

said storage device further stores service indication information indicating a type of service of said display information; and said selector selects a desired one of a plurality of types of display information which belong to the type of service represented by the service indication information stored in said storage device.

6. A display information receiving device according to claim 1, further comprising:

a storage unit which stores kind indication information indicating the display information and point value information indicating point values in association with each other, said point values being required for permitting the display to display the kind of display information indicated by the kind indication information; and said selection restrictor restricts a total sum of the point values, which are represented by the point value information stored in the storage unit in association with the kind indication information selected by the selector, in accordance with the point value represented by the point value information stored in the storage unit, whereby the number of types of display information selected by the selector is restricted.

7. A display information receiving device according to claim 1, wherein the display control section includes means for permitting the display to display the display information the kind of which is indicated by the kind indication information set by the kind indication information-setter.

8. A display information receiving device according to claim 7, wherein said storage device is a storage medium which is loadable into and removable from a device body, and said storage medium includes said kind indication information-setter.

9. A display information receiving device according to claim 1, wherein said storage device is a storage medium which is loadable into and removable from a device body.

10. A display information receiving device according to claim 1, wherein the point value varies in accordance with said plurality of kinds of information, and wherein said selection restrictor restricts the number of kinds of display information to be selected by the selector, by limiting a total sum of the point values in accordance with the point values represented by the point value information.

11. A display information receiving device comprising:

a receiver which receives display information, information indicative of an informant who provides said display information, and information indicative of the kind of said display information, all transmitted from a display information transmitting station;

a display which displays the display information received by said receiving section;

a device body which enables installation and removal of a storage medium that stores the information indicating the informant and the information indicating the kind of said display information;

a first comparator which compares the information indicating said informant stored in the storage medium installed in said device body with the information indicating the informant of said display information received by said receiving section;

a second comparator which compares the information indicating the kind of said display information stored in the stored medium with the information indicating the kind of said display information received by said receiving section; and a control section which inhibits the display of said display information according to comparison results of said first and second comparators.

12. A display information receiving device according to claim 11, wherein:

said display information is multiplexed with FM broadcast radio waves and then transmitted;

said receiver includes a first decoder which receives the FM broadcast radio waves and decodes the FM broadcast radio waves to generate an FM broadcast sound information, and a second decoder which decodes said display information multiplexed with said FM broadcast radio waves; and the display information receiving device further comprises a sound outputting section which outputs a sound in accordance with said FM broadcast sound information decoded by said first decoder.

13. A display information receiving device according to claim 11, wherein:

said storage medium further stores time information indicating time; and the device further comprises:
- a time acquiring section which acquires the present time; and
- a judging section which determines whether or not the present time acquired by said time acquiring section has reached the time indicated by the time information stored in said storage medium; and said control section includes means for inhibiting the display of said display information transmitted from the display information transmitting station after said judging section has judged that the present time has reached the stored time.

14. A display information receiving device according to claim 11, wherein:

said display information comprises pay display information;

said receiving section further includes means for receiving free display information; and said display includes means for displaying the free display information received by said receiving section.

15. A display information receiving device comprising:

a receiver which receives display information transmitted from a display information transmitting station;

a display which displays the display information received by said receiver;

a storage device which stores reception frequency information indicating a reception frequency for receiving the display information and information for specifying the reception frequency such that the reception frequency information is associated with the information for specifying the reception frequency;

a device body which enables installation and removal of a storage medium that stores the information for specifying the reception frequency; and a controller which controls the reception frequency based on the reception frequency information stored in said storage device such that the reception frequency information is associated with the information for specifying the reception frequency stored in said storage medium.

16. A display information receiving device according to claim 15, wherein:

said display information is multiplexed with FM broadcast radio waves and then transmitted;

said receiver includes a first decoder which receives the FM broadcast radio waves and decodes the FM broadcast radio waves to generate an FM broadcast sound information, and a second decoder which decodes said display information multiplexed with said FM broadcast radio waves; and the display information receiving device further comprises a sound outputting section which outputs a sound in accordance with said FM broadcast sound information decoded by said first decoder.

17. A display information receiving device according to claim 15, wherein:

said storage medium further stores the time information indicating time; and the device further comprises:
- a time acquiring section for acquiring the present time; and
- a judging section which judges whether or not the present time acquired by said time acquiring section has reached the time indicated by the time information stored in said storage medium; and said controller further includes means for inhibiting the display of said display information transmitted from the display information transmitting station after said judging section has judged that the present time has reached the stored time.

18. A display information receiving device according to claim 15, wherein:

said display information comprises pay display information;

said receiver includes means for receiving free display information; and said display includes means for displaying the free display information received by said receiver.

19. A display information receiving device according to claim 15, wherein:

said storage medium stores a plurality of information pieces which specify said reception frequency such that the information pieces are associated with the reception frequency information;

the device further comprises a selector which selects a desired one of the plurality of information pieces for specifying said reception frequency stored in said storage medium; and said controller controls the reception frequency based on the reception frequency information stored in said storage device which is associated with said desired one of the information pieces selected by said selector.

20. A storage medium detachable from a display information receiving device that receives display information transmitted from a display information transmitting station, comprising:

a storage device which stores point value information denoting a point value for limiting a number of kinds of display information allowed to be selected, the point value information being for use in selecting a desired one of the kinds of display information; and interface means for interfacing said storage device with said display information receiving device.

21. A storage medium detachable from a display information receiving device that receives display information transmitted from a display information transmitting station, comprising:

a storage device which stores information indicating the kind of the display information and information indicating an informant of the display information for controlling whether a display on said display information receiving device is allowed or inhibited; and interface means for interfacing said storage means with said display information receiving device.

22. A storage medium detachable from a display information receiving device that receives display information transmitted from a display information transmitting station, comprising:

a storage device which stores information for specifying a desired one of a plurality of reception frequency information pieces stored in the display information receiving device; and interface means for interfacing said storage device with said display information receiving device.

23. A storage medium according to claim 22, wherein said storage device includes means for storing a plurality of information pieces for specifying said reception frequency.

24. A display information receiving device comprising:

a receiver which receives a plurality of kinds of display information transmitted from a display information transmitting station;

a display which displays the display information received by said receiver;

a storage device which stores point value information indicating a point value;

a selector which selects a desired one of the kinds of said display information;

a selection restrictor which restricts the number of kinds of display information to be selected by said selector in accordance with the point value indicated by the point value information; and a display control section which permits the display to display the display information the kind of which is selected by said selector.

* * * * *